(12) United States Patent
Yoshida et al.

(10) Patent No.: US 10,834,348 B2
(45) Date of Patent: Nov. 10, 2020

(54) IMAGING SENSOR, CHIP, IMAGING SYSTEM, AND MOVING BODY

(71) Applicant: CANON KABUSHIKI KAISHA, Tokyo (JP)

(72) Inventors: Daisuke Yoshida, Ebina (JP); Takahiro Shirai, Isehara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 16/141,799

(22) Filed: Sep. 25, 2018

(65) Prior Publication Data

US 2019/0104274 A1 Apr. 4, 2019

(30) Foreign Application Priority Data

Sep. 29, 2017 (JP) .................. 2017-192053

(51) Int. Cl.
*H04N 5/3745* (2011.01)
*H04N 5/369* (2011.01)
*H04N 5/378* (2011.01)

(52) U.S. Cl.
CPC ......... *H04N 5/37455* (2013.01); *H04N 5/378* (2013.01); *H04N 5/379* (2018.08); *H04N 5/37457* (2013.01)

(58) Field of Classification Search
CPC ............... H04N 5/37455; H04N 5/379; H04N 5/37457; H04N 5/378
See application file for complete search history.

(56) References Cited

U.S. PATENT DOCUMENTS

2015/0237281 A1 8/2015 Deguchi
2016/0037091 A1* 2/2016 Yoshida .................. H03M 1/18
348/301
2018/0054576 A1* 2/2018 Otaka .................. H04N 5/3559

FOREIGN PATENT DOCUMENTS

| JP | 07-336224 A | 12/1995 |
| JP | 2014-131146 A | 7/2014 |
| JP | 2014-131147 A | 7/2014 |
| JP | 2015-167347 A | 9/2015 |
| JP | 2017-79464 A | 4/2017 |

* cited by examiner

*Primary Examiner* — Nicholas G Giles
(74) *Attorney, Agent, or Firm* — Canon U.S.A., Inc. IP Division

(57) ABSTRACT

An imaging sensor includes a pixel, an amplifier, and a successive approximation analog-to-digital (AD) converter. The pixel is configured to output a pixel signal. The amplifier is configured to output an amplification signal obtained by amplifying the pixel signal. The successive approximation AD converter detects whether or not the amplification signal is within a predetermined signal range.

23 Claims, 22 Drawing Sheets

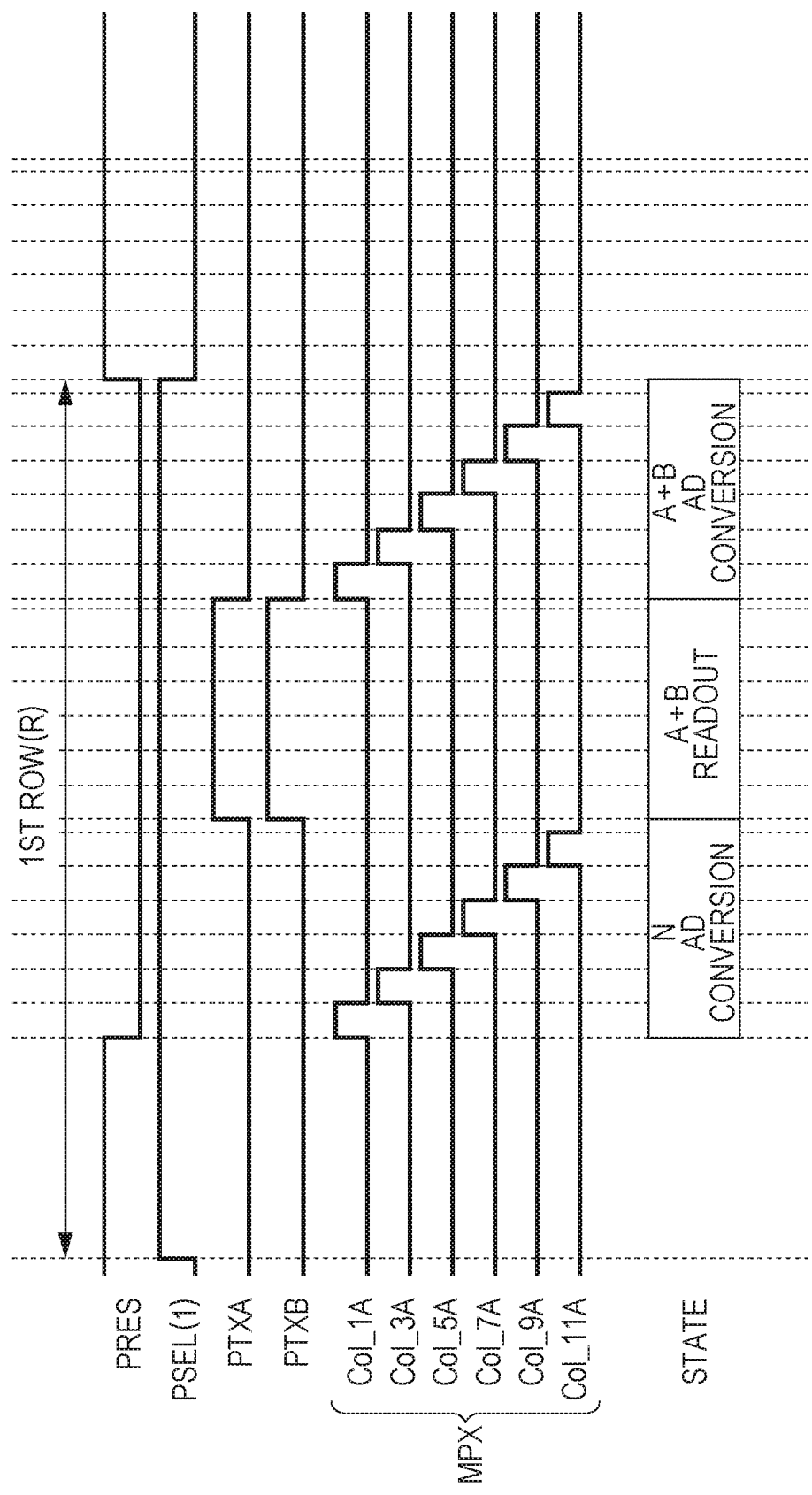

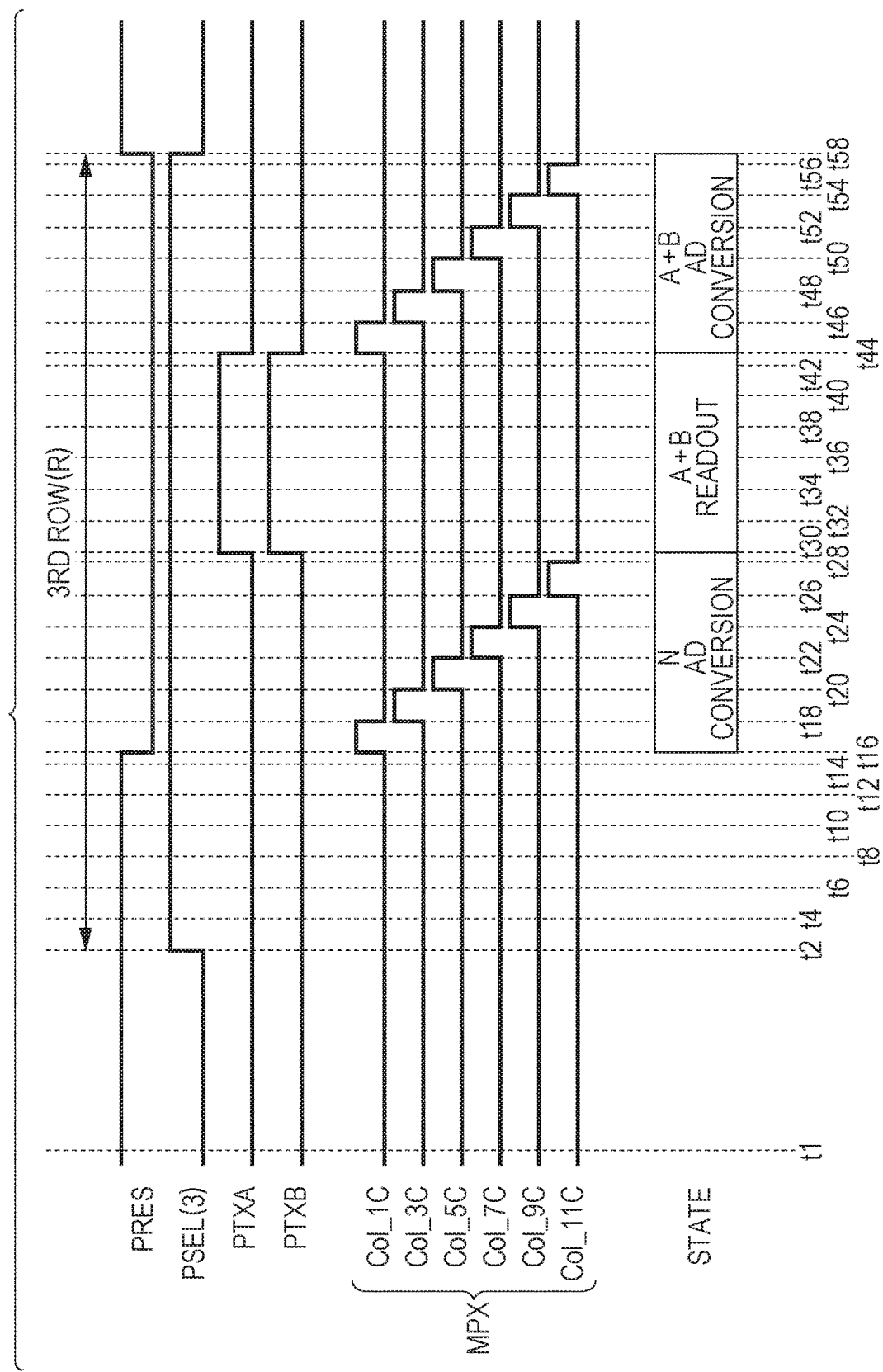

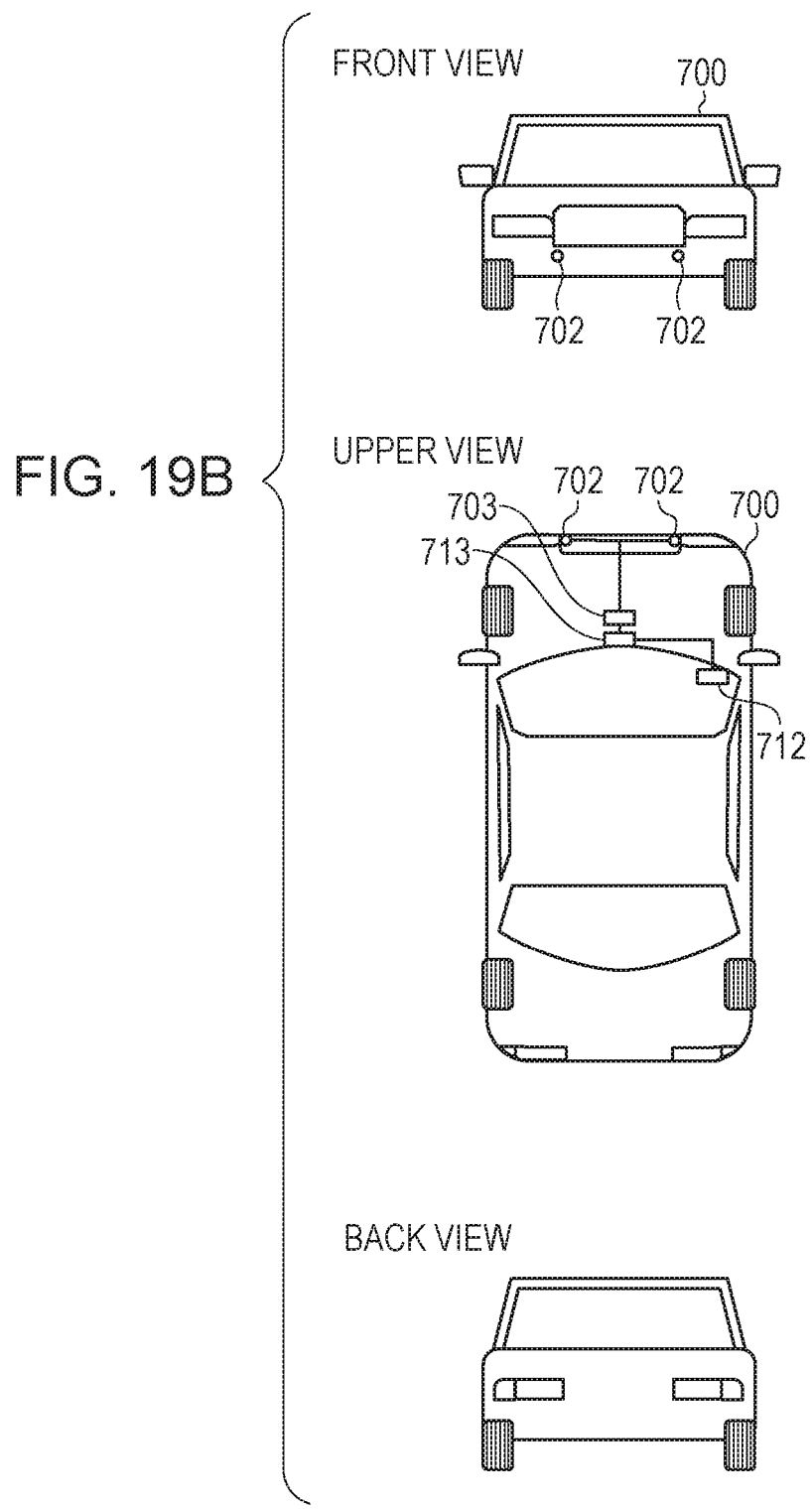

IMAGING SENSOR, CHIP, IMAGING SYSTEM, AND MOVING BODY

BACKGROUND OF THE INVENTION

Field of the Invention

One disclosed aspect of the embodiments relates to an imaging sensor, a chip, an imaging system, and a moving body.

Description of the Related Art

An imaging sensor in which an amplifier applies a gain to a pixel signal generated by a pixel to realize a wide dynamic range or high-speed readout has been proposed. Japanese Patent Laid-Open No. 2017-79464 describes that the gain with respect to the pixel signal is changed on the basis of a result of a comparison between a signal level of the pixel signal and a threshold. Furthermore, Japanese Patent Laid-Open No. 2017-79464 describes that the pixel signal to which this gain is applied is converted into a digital signal by an analog-to-digital (AD) converter using a ramp signal.

SUMMARY OF THE INVENTION

According to an aspect of the embodiments, an imaging sensor includes a pixel, an amplifier, and a successive approximation analog-to-digital (AD) converter. The pixel is configured to output a pixel signal. The amplifier is configured to output an amplification signal obtained by amplifying the pixel signal. The successive approximation analog-to-digital (AD) converter is configured to perform AD conversion of the amplification signal. The AD converter detects whether or not the amplification signal is within a predetermined signal range. In a case where a result of the detection indicates that an amplitude of the amplification signal is smaller than a predetermined value, the amplifier sets a gain to be applied to the pixel signal as a first gain and outputs the amplification signal, and the AD converter performs the AD conversion of the amplification signal amplified at the first gain. In a case where the result of the detection indicates that the amplitude of the amplification signal is larger than the predetermined value, the amplifier sets the gain to be applied to the pixel signal as a second gain that is lower than the first gain and outputs the amplification signal, and the AD converter performs the AD conversion of the amplification signal amplified at the second gain. The pixel is arranged in a first chip. The amplifier and the AD converter are arranged in a second chip. The first chip and the second chip are stacked on each other.

Further features of the disclosure will become apparent from the following description of exemplary embodiments with reference to the attached drawings.

BRIEF DESCRIPTION OF THE DRAWINGS

FIGS. 14A and 14B illustrate an operation of the imaging sensor.
FIGS. 19A and 19B illustrate a configuration of a moving body.

DESCRIPTION OF THE EMBODIMENTS

Figure 1:
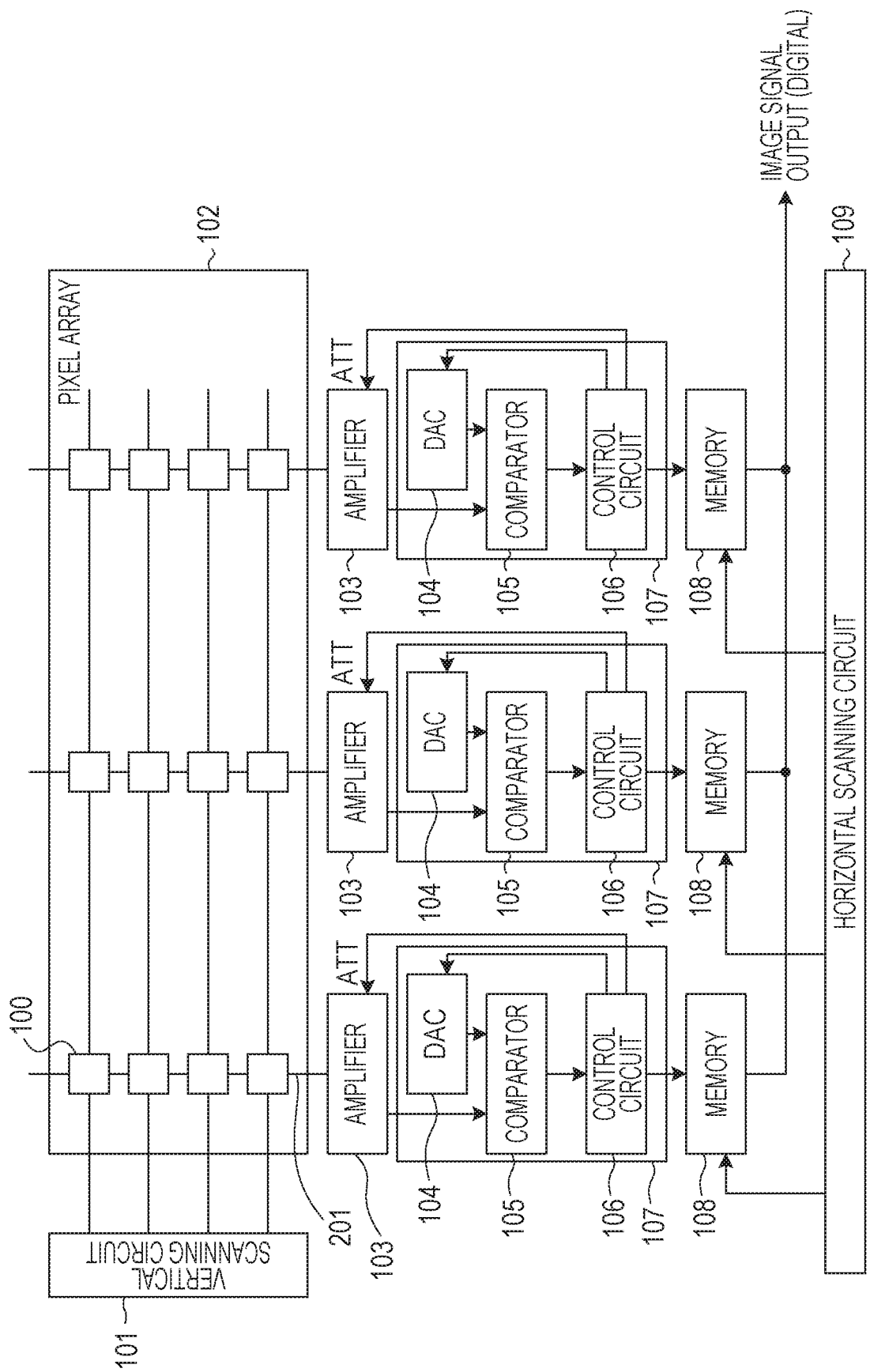
FIG. 1 illustrates a configuration of an imaging sensor.

The AD converter using the ramp signal has been described with regard to the imaging sensor described in Japanese Patent Laid-Open No. 2017-79464. However, an appropriate circuit configuration in a combination of an AD converter based on another AD conversion format and an amplifier has not been discussed. In particular, a reduction in a circuit area in the combination of the AD converter based on another AD conversion format and the amplifier has not been discussed.

A technology which will be described below aims at providing an appropriate circuit configuration in which the circuit area is reduced in a combination of a successive approximation AD converter and the amplifier.

Exemplary embodiments of the disclosure will be described below with reference to the accompanying drawings. The same reference numerals are assigned to similar elements through various exemplary embodiments, and duplicated descriptions will be omitted. In addition, the respective exemplary embodiments can be appropriately modified and combined with each other.

First Exemplary Embodiment

A configuration of an imaging sensor according to the present embodiment will be described with reference to a circuit block diagram of FIG. 1. The imaging sensor includes respective components illustrated in FIG. 1. A plurality of pixels 100 arranged in rows and columns constitute a pixel array 102. In FIG. 1, a case will be described where the pixel array 102 includes pixels in four rows and three columns, for example. However, the arrangement of the pixel array 102 is not limited to this. Each of the pixels 100 generates a pixel signal in accordance with light incident on the pixel 100. The plurality of pixels 100 constituting the same row are commonly connected to a single driving line. A control signal for controlling an operation of the pixel 100 is supplied from a vertical scanning circuit 101 to the pixels 100 via the driving line. On the other hand, the plurality of pixels 100 constituting the same column are commonly connected to a single signal line 201. A voltage signal supplied to an amplifier 103 via the signal line 201 is referred to as a signal Vv1. In a case where the pixel signal is read out from the pixel 100 to the signal line 201, the signal Vv1 takes a value in accordance with the pixel signal.

The amplifier 103 generates an amplification signal Vamp by amplifying the signal Vv1.

The imaging sensor includes an AD converter 107. The AD converter 107 is a successive approximation AD converter. The AD converter (hereinafter, which will be referred to as ADC) 107 includes a digital-to-analog converter 104 (hereinafter, which will be referred to as DAC 104). The ADC 107 also includes a comparator 105 and a control circuit 106. The amplification signal Vamp is supplied to the comparator 105. As will be described below, the amplifier 103 generates the amplification signal Vamp by amplifying the signal Vv1 using any one of plural gains. In a case where the signal Vv1 takes the value in accordance with the pixel signal, the amplifier 103 amplifies the pixel signal.

A comparison signal from the DAC 104 is input to the comparator 105 in addition to the amplification signal Vamp from the amplifier 103. The comparator 105 compares the amplification signal Vamp with the comparison signal and outputs a result of the comparison to the control circuit 106.

The control circuit 106 outputs the comparison result input from the comparator 105 to a memory 108. The comparison result output to the memory 108 is a digital signal corresponding to the amplification signal Vamp.

The comparator 105 also performs a comparison between the amplification signal Vamp and a threshold. A result of this comparison is also output from the comparator 105 to the control circuit 106. The control circuit 106 outputs a signal ATT to the amplifier 103 on the basis of the result of the comparison between the amplification signal Vamp and the threshold which is output to the control circuit 106. The signal ATT is a signal for controlling the gain of the amplifier 103.

The digital signals output to the memory 108 are sequentially read out from the memory 108 column by column by horizontal scanning performed by a horizontal scanning circuit 109.

The amplifier 103, the DAC 104, the comparator 105, the control circuit 106, and the memory 108 are arranged for each of the signal lines 201.

Figure 2:
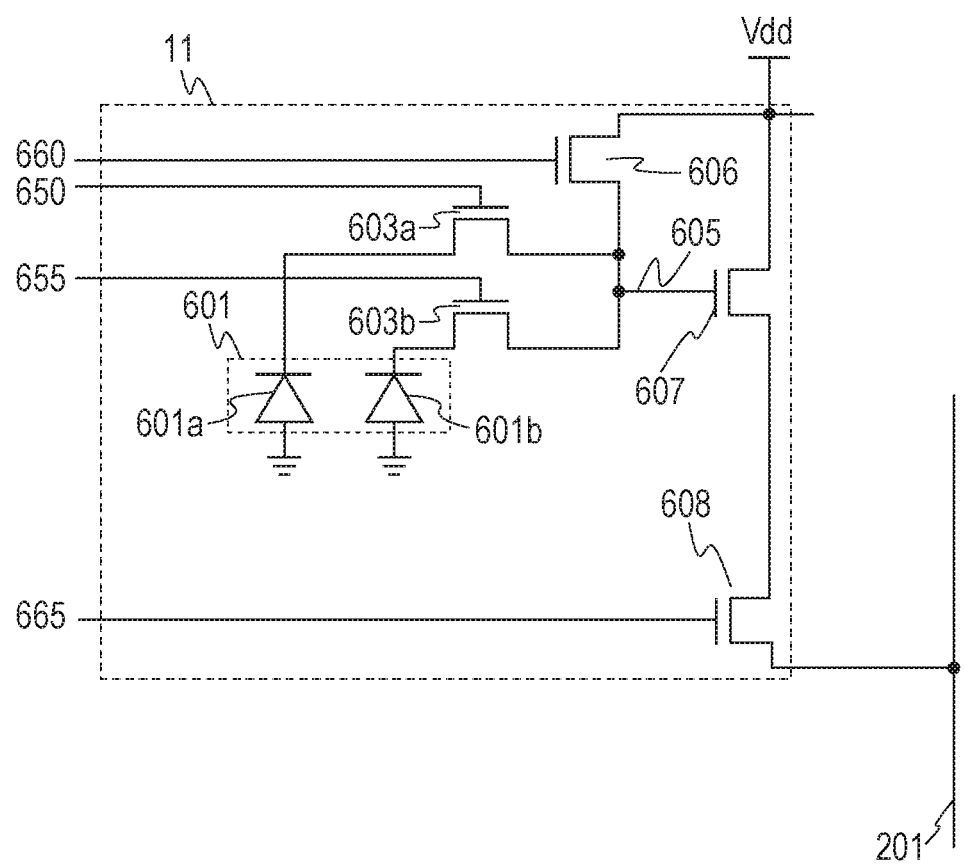
FIG. 2 illustrates an equivalent circuit of a pixel.

FIG. 2 is an equivalent circuit diagram of the pixel 100 according to the present exemplary embodiment. The pixel 100 includes photodiodes 601*a* and 601*b* functioning as photoelectric conversion units. Light that has passed through a single micro lens and a color filter which are not illustrated in the drawing is incident on the photodiodes 601*a* and 601*b* of the pixel 100. A wavelength of the light incident on the photodiode 601*a* is substantially the same as a wavelength of the light incident on the photodiode 601*b*.

The photodiode 601*a* is connected to a floating diffusion unit (hereinafter, which will be referred to as an FD unit) 605 via a transfer transistor 603*a*. A gate of the transfer transistor 603*a* is connected to the vertical scanning circuit which is not illustrated in the drawing via a control line 650.

The photodiode 601*b* is connected to the FD unit 605 via a transfer transistor 603*b*. A gate of the transfer transistor 603*b* is connected to the vertical scanning circuit which is not illustrated in the drawing a control line 655.

The FD unit 605 is connected to a reset transistor 606 and a gate of an amplification transistor 607.

The reset transistor 606 and the amplification transistor 607 are supplied with a power supply voltage Vdd. A gate of the reset transistor 606 is connected to the vertical scanning circuit which is not illustrated in the drawing via a control line 660.

The amplification transistor 607 is connected to a selection transistor 608. A gate of the selection transistor 608 is connected to the vertical scanning circuit which is not illustrated in the drawing via a control line 665.

The selection transistor 608 is connected to the signal line 201.

Figure 3:
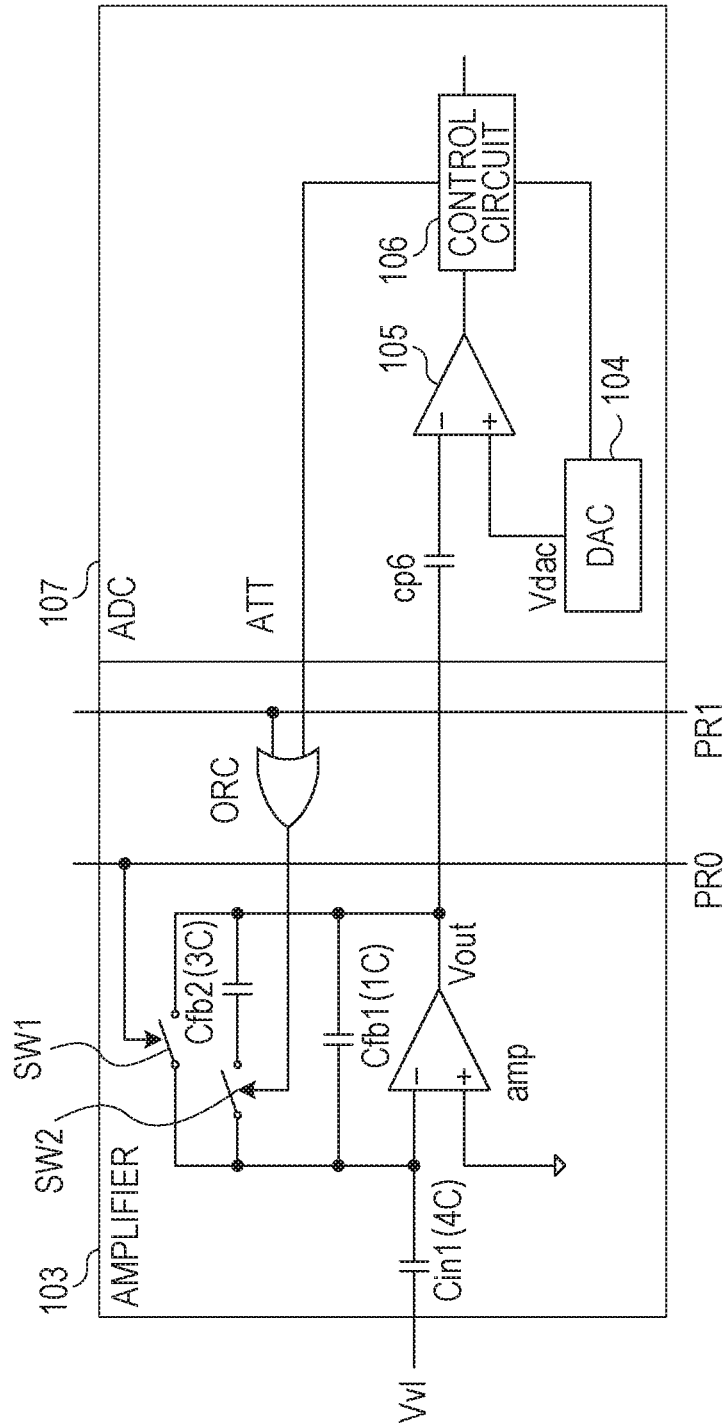
FIG. 3 illustrates configurations of an amplifier and an AD converter.

FIG. 3 is an equivalent circuit diagram of the amplifier 103 and the ADC 107 illustrated in FIG. 1. The amplifier 103 includes an amplifier amp, a capacitive element Cin1 corresponding to an input capacitance of the amplifier amp, a capacitive element Cfb1 and a capacitive element Cfb2 corresponding to a feedback capacitance of the amplifier amp, and switches SW1 and SW2. Capacitance values of the capacitive element Cin1, the capacitive element Cfb1, and the capacitive element Cfb2 are respectively 4C, 1C, and 3C in the stated order. The switch SW1 is controlled by a signal PR0 supplied from a timing generator which is not illustrated in the drawing. The switch SW2 is controlled by a signal output by an OR circuit ORC. The OR circuit ORC outputs a signal based on a logical sum of a control signal PR1 supplied from the timing generator which is not illustrated in the drawing and the signal ATT supplied from the control circuit 106.

The signal Vv1 of the signal line 201 is input to the amplifier 103. The amplifier amp applies a gain determined on the basis of a capacitance ratio of the capacitive element Cin1 to a capacitance connected to both an output node and an input node of the amplifier amp to the signal Vv1. That is, when the switch SW2 is in a non-conductive state, the gain is ×4 (quadruple). On the other hand, when the switch SW2 is in a conductive state, the gain is ×1.

The amplifier amp is connected to a capacitive element cp6 corresponding to an input capacitance of the ADC 107. The ADC 107 is input to one of input nodes of the comparator 105. The DAC 104 is connected to the other input node of the comparator 105. The control circuit 106 is connected to an output node of the comparator 105. The control circuit 106 is connected to the DAC 104 and the OR circuit ORC.

Equivalent Circuit of the Successive Approximation ADC

Figure 4:
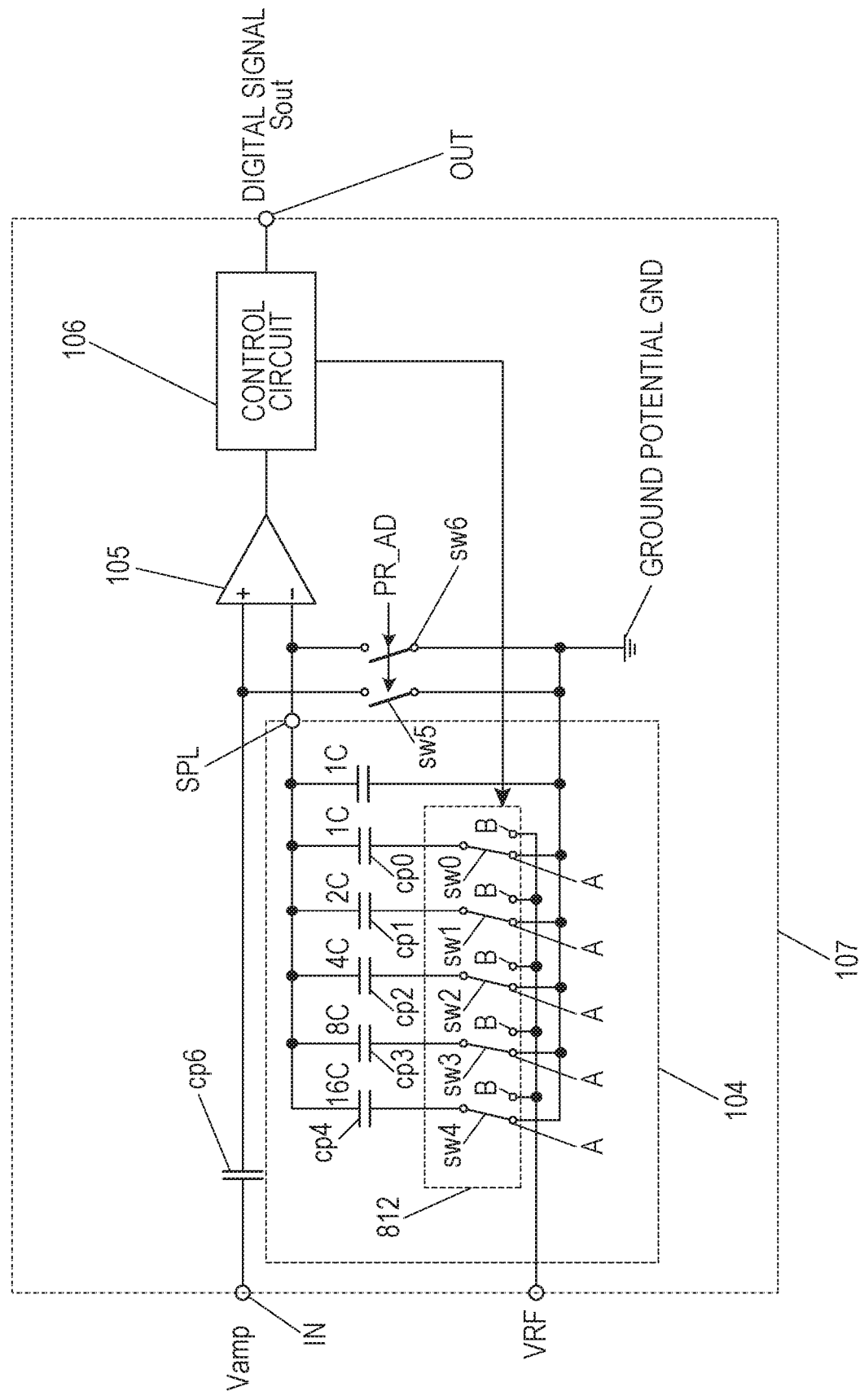
FIG. 4 illustrates an equivalent circuit of the AD converter.

FIG. 4 illustrates details of an equivalent circuit of the ADC 107.

The ADC 107 includes an input terminal IN and an output terminal OUT. The ADC 107 converts the amplification signal Vamp corresponding to an analog signal input from the input terminal IN into a digital signal Sout to be output from the output terminal OUT. The amplification signal Vamp can be set as one or both of an N signal and an S signal which will be described according to the following exemplary embodiment. The ADC 107 converts the amplification signal Vamp into the digital signal Sout by a 5-bit resolution.

The ADC 107 further includes the DAC 104 that generates the comparison signal used for the comparison with the amplification signal Vamp. The DAC 104 includes a plurality of capacitive elements cp0 to cp4 having binary weight capacitance values and a plurality of switches sw0 to sw4 connected to the capacitive elements cp0 to cp4. The plurality of switches sw0 to sw4 constitute a switch circuit configured to select at least one of the capacitive elements cp0 to cp4. The binary weight refers to a set of weights (capacitance values) so as to form a geometrical progression whose geometric ratio is 2. In the example of FIG. 4, the capacitive elements cp0 to cp4 have capacitance values of 1C, 2C, 4C, 8C, and 16C in the stated order. One electrode of each of the capacitive elements cp0 to cp4 is connected to a supply terminal SPL of the DAC 104, and the other electrodes are respectively connected to the switches sw0 to sw4. One terminals of the switches sw0 to sw4 are respectively connected to the capacitive elements cp0 to cp4, and the other terminals toggle between terminals A and terminals B. The terminal A is supplied with a ground potential GND, and the terminal B is supplied with a reference voltage VRF. The reference voltage VRF is a constant voltage supplied from the outside of the ADC 107 and takes a value higher than the ground potential GND. When the switch sw0 toggles to the terminal A, the capacitive element cp0 is supplied with the ground potential GND. When the switch sw0 toggles to the terminal B, the capacitive element cp0 is supplied with the reference voltage VRF. The same applies to the other switches sw1 to sw4. When the switches sw0 to sw4 are switched, a combined capacitance value of the capacitive elements connected between the supply terminal SPL and the reference voltage VRF changes, and a value of a comparison signal Vcmp output from the supply terminal SPL as a result changes.

The ADC 107 further includes the comparator 105. The comparator 105 compares the value of the amplification signal Vamp with the value of the comparison signal Vcmp and outputs a signal in accordance with the comparison result. A non-inverting terminal of the comparator 105 is supplied with the amplification signal Vamp via the capacitive element cp6. An inverting terminal of the comparator 105 is supplied with the comparison signal Vcmp from the supply terminal SPL of the DAC 104. With this configuration, High is output in a case where the value of the amplification signal Vamp is higher than or equal to the value of the comparison signal Vcmp, and Low is output in a case where the value of the amplification signal Vamp is lower than the value of the comparison signal Vcmp. In this example, High is input in a case where the value of the amplification signal Vamp and the value of the comparison signal Vcmp are equal to each other, but Low may be output instead. The capacitive element cp6 adjusts the value of the amplification signal Vamp into a range in which the comparison with the comparison signal Vcmp can be performed. According to the present exemplary embodiment, to simplify the descriptions, a case will be discussed where the value of the amplification signal Vamp is higher than or equal to the ground potential GND and lower than or equal to the reference voltage VRF, and the signal having the same magnitude as the amplification signal Vamp is supplied to the non-inverting terminal of the comparator 105.

In the example of FIG. 4, the amplification signal Vamp is supplied to the non-inverting terminal of the comparator 105, and the comparison signal Vcmp is supplied to the inverting terminal of the comparator 105. However, other configurations may also be adopted as long as a magnitude relationship between the value of the amplification signal Vamp and the value of the comparison signal Vcmp can be determined. For example, a difference between the amplification signal Vamp and the comparison signal Vcmp may be supplied to the non-inverting terminal of the comparator 105, and the ground potential GND may be supplied to the inverting terminal of the comparator 105.

The ADC 107 further includes switches sw5 and sw6. When the switches sw5 and sw6 are put into a conductive state, the non-inverting terminal and the inverting terminal of the comparator 105 are supplied with the ground potential GND, and the comparator 105 is reset.

The ADC 107 further includes the control circuit 106. The control circuit 106 is supplied with the comparison result from the comparator 105. The control circuit 106 generates the digital signal Sout on the basis of this comparison result and outputs the digital signal Sout from the output terminal OUT. The control circuit 106 also transmits the control signal to the respective switches sw0 to sw6 to switch their states.

Operations of the Imaging Sensor

Figure 5:
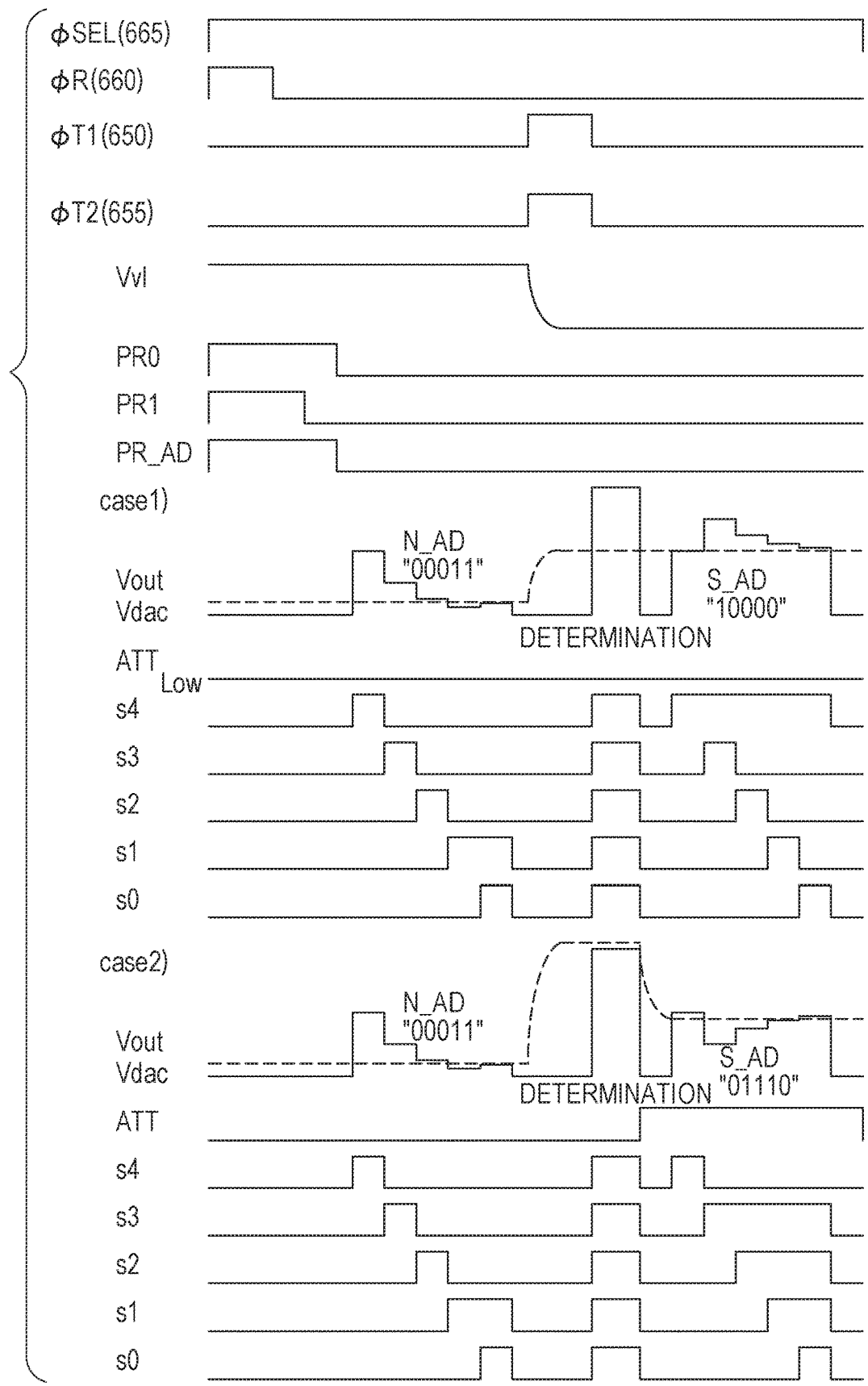
FIG. 5 is a timing chart illustrating an operation of the imaging sensor.

In FIG. 5, signals φSEL, φR, φT1, and φT2 are control signals output by the vertical scanning circuit 101 to the pixel 100. In FIG. 5, control lines to which the respective control signals are output are indicated by brackets.

In FIG. 5, s0 to s4 indicate values of the control signals supplied from the control circuit 106 to the switches sw0 to sw4. The switches sw0 to sw4 toggle to the terminal B in a case where the supplied control signal is High and toggle to the terminal A in a case where the control signal is Low. A signal PR_AD is a control signal supplied to the switches sw5 and sw6.

Next, an AD conversion operation will be described in a time series manner. Hereinafter, case 1 and case 2 will be respectively described. The case 1 corresponds to a case where the amplification signal Vamp obtained by amplifying the pixel signal based on the light by the ×4 gain has an amplitude smaller than a threshold. The case 2 corresponds to a case where the amplification signal Vamp obtained by amplifying the pixel signal based on the light by the ×4 gain has the amplitude larger than the threshold.

First, operations common to the case 1 and the case 2 will be described.

The vertical scanning circuit 101 sets the signal φSEL supplied to a row where the pixel signal is to be read out to a High level. With this configuration, the amplification transistor 607 starts a source follower operation. The timing generator sets each of the signal PR0, the control signal PR1, and the signal PR_AD to the High level. With this configuration, each of the capacitive element Cin1, the capacitive elements Cfb1 and Cfb2, and the capacitive element cp6 is reset.

Thereafter, the vertical scanning circuit 101 sets the signal φR to a Low level. With this configuration, the reset of the FD unit 605 is cancelled. With this configuration, the amplification transistor 607 outputs the noise signal corresponding to the potential of the FD unit 605 where the reset is cancelled to the signal line 201.

Then, the timing generator sets the control signal PR1 to the Low level. With this configuration, the noise signal output by the amplification transistor 607 is clamped at the capacitive element Cin1.

Thereafter, the timing generator sets the signals PR0 and PR_AD to the Low level. When the signal PR0 is set to the Low level, the gain of the amplifier amp is set as ×4. When the signal PR_AD turns to the Low level, the reset of the capacitive element cp6 is cancelled.

The amplification signal Vamp at a reset level is input to the comparator 105. The ADC 107 performs the AD conversion of the amplification signal Vamp at the reset level.

The control circuit 106 changes the control signal supplied to the switch sw4 to High. With this configuration, the switch sw4 toggles to the terminal B, and the reference voltage VRF is applied to the supply terminal SPL of the DAC 104 via the capacitive element cp4 having the highest capacitance value among the binary weights. As a result, the value of the comparison signal Vcmp becomes equal to VRF/2. The control circuit 106 determines that the value of the amplification signal Vamp is lower than the value of the comparison signal Vcmp (VRF/2) on the basis of the comparison result from the comparator 105 and returns the control signal supplied to the switch sw4 to Low. This comparison result means that a most significant bit (MSB) of the value of the digital signal Sout (the fifth bit in a case where a least significant bit (LSB) is set as the first bit) is 0.

Next, the control circuit 106 changes the control signal supplied to the switch sw3 to High. With this configuration, the reference voltage VRF is applied to the supply terminal SPL of the DAC 104 via the capacitive element cp3 having the second highest capacitance value among the binary weights. As a result, the value of the comparison signal Vcmp becomes equal to VRF/4. The control circuit 106 determines that the value of the amplification signal Vamp is lower than the value of the comparison signal Vcmp (VRF/4) on the basis of the comparison result from the comparator 105 and returns the control signal supplied to the switch sw3 to Low. This comparison result means that the fourth bit of the value of the digital signal Sout is 0.

Next, the control circuit 106 changes the control signal supplied to the switch sw2 to High. With this configuration, the reference voltage VRF is applied to the supply terminal SPL of the DAC 104 via the capacitive element cp2 having the third highest capacitance value among the binary weights. As a result, the value of the comparison signal Vcmp becomes equal to VRF/8. The control circuit 106 determines that the value of the amplification signal Vamp is lower than the value of the comparison signal Vcmp (VRF/8) on the basis of the comparison result from the comparator 105 and sets the control signal supplied to the switch sw2 to Low. This comparison result means that the third bit of the value of the digital signal Sout is 0.

Next, the control circuit 106 changes the control signal supplied to the switch sw1 to High. With this configuration, the reference voltage VRF is applied to the supply terminal SPL of the DAC 104 via the capacitive element cp1 having the fourth highest capacitance value among the binary weights. As a result, the value of the comparison signal Vcmp becomes equal to VRF/16. The control circuit 106 determines that the value of the amplification signal Vamp is higher than the value of the comparison signal Vcmp (VRF/16) on the basis of the comparison result from the comparator 105 and keeps the control signal supplied to the switch sw1 at High. With this configuration, the value of the comparison signal Vcmp is maintained at VRF/16. This comparison result means that the second bit of the value of the digital signal Sout is 1.

Finally, the control circuit 106 changes the control signal supplied to the switch sw0 to High. With this configuration, the reference voltage VRF is applied to the supply terminal SPL of the DAC 104 via the capacitive element cp0 and the capacitive element cp1 having the fifth highest capacitance value among the binary weights. As a result, the value of the comparison signal Vcmp becomes equal to VRF×3/32. The control circuit 106 determines that the value of the amplification signal Vamp is higher than the value of the comparison signal Vcmp (VRF×3/32) on the basis of the comparison result from the comparator 105 and keeps the control signal supplied to the switch sw0 at High. This comparison result means that the first bit of the value of the digital signal Sout is 1.

As a result of the above-described successive approximation, the control circuit 106 determines that the digital signal Sout corresponding to the amplification signal Vamp at the reset level is 00011.

In this manner, the ADC 107 can perform the AD conversion for generating the digital signal corresponding to the input analog signal.

Next, the vertical scanning circuit 101 sets both of the signals φT1 and φT2 to the High level to be thereafter set to the Low level. With this configuration, charges accumulated by the photodiodes 601a and 601b are transferred to the FD unit 605 via the transfer transistors 603a and 603b. The respective charges of the photodiodes 601a and 601b are added to each other in the FD unit 605. With this configuration, the FD unit 605 takes a potential corresponding to charges obtained by adding the respective charges of the photodiodes 601a and 601b to each other. It is supposed that a signal output by the amplification transistor 607 on the basis of the potential of the FD unit 605 based on the charges of only the photodiode 601a is set as an A signal. On the other hand, it is supposed that a signal output by the amplification transistor 607 on the basis of the potential of the FD unit 605 based on the charges of only the photodiode 601b is set as a B signal. According to this notation, the signal output by the amplification transistor 607 on the basis of the potential of the FD unit 605 corresponding to the charges obtained by the respective charges of the photodiodes 601a and 601b to each other can be regarded as an A+B signal obtaining by adding the A signal and the B signal to each other. The A+B signal of the pixel 100 is output to the signal line 201 in each column.

The control circuit 106 sets all the control signals supplied to the switches sw0 to sw4 to the High level. With this configuration, a voltage corresponding to the threshold is input to the comparator 105 from the DAC 104.

With this configuration, the comparator 105 compares the threshold output from the DAC 104 with the amplification signal Vamp obtained by amplifying the A+B signal by the ×4 gain. This is an operation for detecting whether or not the amplification signal Vamp is within a predetermined range which is performed by the AD converter.

Operation in the Case 1

The case 1 corresponds to a case where the amplitude of the amplification signal Vamp obtained by amplifying the A+B signal by the ×4 gain is lower than the amplitude of the threshold. That is, a state is established in which the potential of the input node of the ADC 107 does not overflow. In other words, it can also be mentioned that the potential of the input node of the ADC 107 is within the amplitude range of the analog signal in which the AD conversion can be performed. In this case, the output of the comparator 105 remains at the Low level. The control circuit 106 that has received the comparison result at the Low level keeps the signal ATT at the Low level. Then, the ADC 107 performs the AD conversion of the amplification signal Vamp obtained by amplifying the A+B signal by the ×4 gain.

The control circuit 106 changes the control signal supplied to the switch sw4 to High. With this configuration, the switch sw4 toggles to the terminal B, and the reference voltage VRF is applied to the supply terminal SPL of the DAC 104 via the capacitive element cp4 having the highest capacitance value among the binary weights. As a result, the value of the comparison signal Vcmp becomes equal to VRF/2. The control circuit 106 determines that the value of the amplification signal Vamp is higher than the value of the comparison signal Vcmp (VRF/2) on the basis of the comparison result from the comparator 105 and keeps the control signal supplied to the switch sw4 at High. With this configuration, the value of the comparison signal Vcmp is maintained at VRF/2. This comparison result means that the MSB of the value of the digital signal Sout (the fifth bit in a case where the LSB is set as the first bit) is 1.

Next, the control circuit 106 changes the control signal supplied to the switch sw3 to High. With this configuration, the reference voltage VRF is applied to the supply terminal SPL of the DAC 104 via the capacitive element cp4 and the capacitive element cp3 having the second highest capacitance value among the binary weights. As a result, the value of the comparison signal Vcmp becomes equal to VRF×3/4. The control circuit 106 determines that the value of the amplification signal Vamp is lower than the value of the comparison signal Vcmp (VRF×3/4) on the basis of the comparison result from the comparator 105 and returns the control signal supplied to the switch sw3 to Low. This comparison result means that the fourth bit of the value of the digital signal Sout is 0.

Next, the control circuit 106 changes the control signal supplied to the switch sw2 to High. With this configuration, the reference voltage VRF is applied to the supply terminal SPL of the DAC 104 via the capacitive element cp2 and the capacitive element cp4 having the third highest capacitance value among the binary weights. As a result, the value of the comparison signal Vcmp becomes equal to VRF×5/8. The control circuit 106 determines that the value of the amplification signal Vamp is lower than the value of the comparison signal Vcmp (VRF×5/8) on the basis of the comparison result from the comparator 105 and sets the control signal supplied to the switch sw2 to Low. This comparison result means that the third bit of the value of the digital signal Sout is 0.

Next, the control circuit 106 changes the control signal supplied to the switch sw1 to High. With this configuration, the reference voltage VRF is applied to the supply terminal SPL of the DAC 104 via the capacitive element cp1 and the capacitive element cp4 having the fourth highest capacitance value among the binary weights. As a result, the value of the comparison signal Vcmp becomes equal to VRF×9/16. The control circuit 106 determines that the value of the amplification signal Vamp is lower than the value of the comparison signal Vcmp (VRF×9/16) on the basis of the comparison result from the comparator 105 and sets the control signal supplied to the switch sw1 to Low. This comparison result means that the second bit of the value of the digital signal Sout is 0.

Finally, the control circuit 106 changes the control signal supplied to the switch sw0 to High. With this configuration, the reference voltage VRF is applied to the supply terminal SPL of the DAC 104 via the capacitive element cp0 and the capacitive element cp4 having the fifth highest capacitance value among the binary weights. As a result, the value of the comparison signal Vcmp becomes equal to VRF×17/32. The control circuit 106 determines that the value of the amplification signal Vamp is lower than the value of the comparison signal Vcmp (VRF×3/32) on the basis of the comparison result from the comparator 105 and sets the control signal supplied to the switch sw0 to Low. This comparison result means that the first bit of the value of the digital signal Sout is 0.

As a result of the above-described successive approximation, the control circuit 106 determines that the digital signal Sout corresponding to the amplification signal Vamp obtained by amplifying the A+B signal by the ×4 gain is 10000.

In this manner, the ADC 107 can perform the AD conversion for generating the digital signal corresponding to the input analog signal.

Operation in the Case 2

The case 2 corresponds to a case where the amplitude of the amplification signal Vamp obtained by amplifying the A+B signal by the ×4 gain is higher than the amplitude of the threshold. That is, a state is established in which the potential of the input node of the ADC 107 overflows. In other words, it can also be mentioned that the potential of the input node of the ADC 107 exceeds the amplitude range of the analog signal in which the AD conversion can be performed. In this case, the output of the comparator 105 changes to the High level. The control circuit 106 that has received the comparison result at the High level sets the signal ATT to the High level. With this configuration, an amplification factor of the amplifier amp changes from ×4 to ×1. The ADC 107 performs the AD conversion of the amplification signal Vamp obtained by amplifying the A+B signal by the ×1 gain.

The control circuit 106 changes the control signal supplied to the switch sw4 to High. With this configuration, the switch sw4 toggles to the terminal B, and the reference voltage VRF is applied to the supply terminal SPL of the DAC 104 via the capacitive element cp4 having the highest capacitance value among the binary weights. As a result, the value of the comparison signal Vcmp becomes equal to VRF/2. The control circuit 106 determines that the value of the amplification signal Vamp is lower than the value of the comparison signal Vcmp (VRF/2) on the basis of the comparison result from the comparator 105 and sets the control signal supplied to the switch sw4 to Low. This comparison result means that the MSB of the value of the digital signal Sout (the fifth bit in a case where the LSB is set as the first bit) is 0.

Next, the control circuit 106 changes the control signal supplied to the switch sw3 to High. With this configuration, the reference voltage VRF is applied to the supply terminal SPL of the DAC 104 via the capacitive element cp3 having the second highest capacitance value among the binary weights. As a result, the value of the comparison signal Vcmp becomes equal to VRF/4. The control circuit 106 determines that the value of the amplification signal Vamp is higher than the value of the comparison signal Vcmp (VRF/4) on the basis of the comparison result from the comparator 105 and keeps the control signal supplied to the switch sw3 at High. This comparison result means that the fourth bit of the value of the digital signal Sout is 1.

Next, the control circuit 106 changes the control signal supplied to the switch sw2 to High. With this configuration, the reference voltage VRF is applied to the supply terminal SPL of the DAC 104 via the capacitive element cp3 and the capacitive element cp2 having the third highest capacitance value among the binary weights. As a result, the value of the comparison signal Vcmp becomes equal to VRF×3/8. The control circuit 106 determines that the value of the amplification signal Vamp is higher than the value of the comparison signal Vcmp (VRF×3/8) on the basis of the comparison result from the comparator 105 and keeps the control signal supplied to the switch sw2 at High. This comparison result means that the third bit of the value of the digital signal Sout is 1.

Next, the control circuit 106 changes the control signal supplied to the switch sw1 to High. With this configuration, the reference voltage VRF is applied to the supply terminal SPL of the DAC 104 via the capacitive element cp3, the capacitive element cp2, and the capacitive element cp1 having the fourth highest capacitance value among the binary weights. As a result, the value of the comparison signal Vcmp becomes equal to VRF×7/16. The control circuit 106 determines that the value of the amplification signal Vamp is higher than the value of the comparison signal Vcmp (VRF×7/16) on the basis of the comparison result from the comparator 105 and keeps the control signal supplied to the switch sw1 at High. This comparison result means that the second bit of the value of the digital signal Sout is 1.

Finally, the control circuit 106 changes the control signal supplied to the switch sw0 to High. With this configuration, the reference voltage VRF is applied to the supply terminal SPL of the DAC 104 via the capacitive element cp3, the capacitive element cp2, and the capacitive element cp1 having the fifth highest capacitance value among the binary weights. As a result, the value of the comparison signal Vcmp becomes equal to VRF×15/32. The control circuit 106 determines that the value of the amplification signal Vamp is lower than the value of the comparison signal Vcmp (VRF× 15/32) on the basis of the comparison result from the comparator 105 and keeps the control signal supplied to the switch sw0 at Low. This comparison result means that the first bit of the value of the digital signal Sout is 0.

As a result of the above-described successive approximation, the control circuit 106 determines that the digital signal Sout corresponding to the amplification signal Vamp obtained by amplifying the A+B signal by the ×1 gain is 01110.

In this manner, the ADC 107 can perform the AD conversion for generating the digital signal corresponding to the input analog signal.

Advantages of the Present Exemplary Embodiment

According to the present exemplary embodiment, the gain of the amplifier 103 which is applied to the pixel signal based on the light is changed depending on the result of the comparison between the pixel signal (A+B signal) based on the light and the threshold. The comparison between the signal based on the light and the threshold for determining the gain of the amplifier 103 is performed by using the comparator 105 that performs successive approximation AD conversion. With this configuration, the circuit area can be reduced with respect to a case where the comparison between the signal based on the light and the threshold is performed by using a comparator different from the comparator 105.

Furthermore, since the threshold is generated by using the DAC 104, it is possible to accurately determine whether or not the pixel signal based on the light is within the signal range in which the AD conversion can be performed by the ADC 107. If a circuit that generates the threshold is a circuit different from the DAC 104, the maximum amplitude of the signal range in which the AD conversion can be performed by the ADC 107 and the amplitude of the threshold may differ due to manufacturing errors of the circuits or the like in some cases. In the above-described case, the maximum amplitude of the signal range in which the AD conversion can be performed by the ADC 107 does not correspond to the threshold, and an error is likely to occur in the change of the gain of the amplifier 103. On the other hand, according to the present exemplary embodiment, the threshold is generated by using the DAC 104. With this configuration, the maximum amplitude of the signal range in which the AD conversion can be performed by the ADC 107 can accurately correspond to the amplitude of the threshold. Therefore, the imaging sensor according to the present exemplary embodiment can accurately determine whether or not the pixel signal based on the light is within the signal range in which the AD conversion can be performed by the ADC 107.

It should be noted that, according to the present exemplary embodiment, the example in which the pixel 100 outputs the A+B signal has been illustrated. As another example, before both the signals φT1 and φT2 are set to the High level, the pixel 100 may output the A signal when the signal φT1 is set to the High level while the signal φT2 is kept at the Low level. The A signal can be used as a focus detecting signal. With regard to the A signal too, similarly as in the A+B signal, the gain of the amplifier 103 can be determined on the basis of the result of the comparison between the threshold and the amplification signal Vamp obtained by amplifying the A signal. Then, similarly as in the case of the A+B signal, the ADC 107 can perform the AD conversion operation of the amplification signal Vamp obtained by amplifying the A signal.

Figure 6:
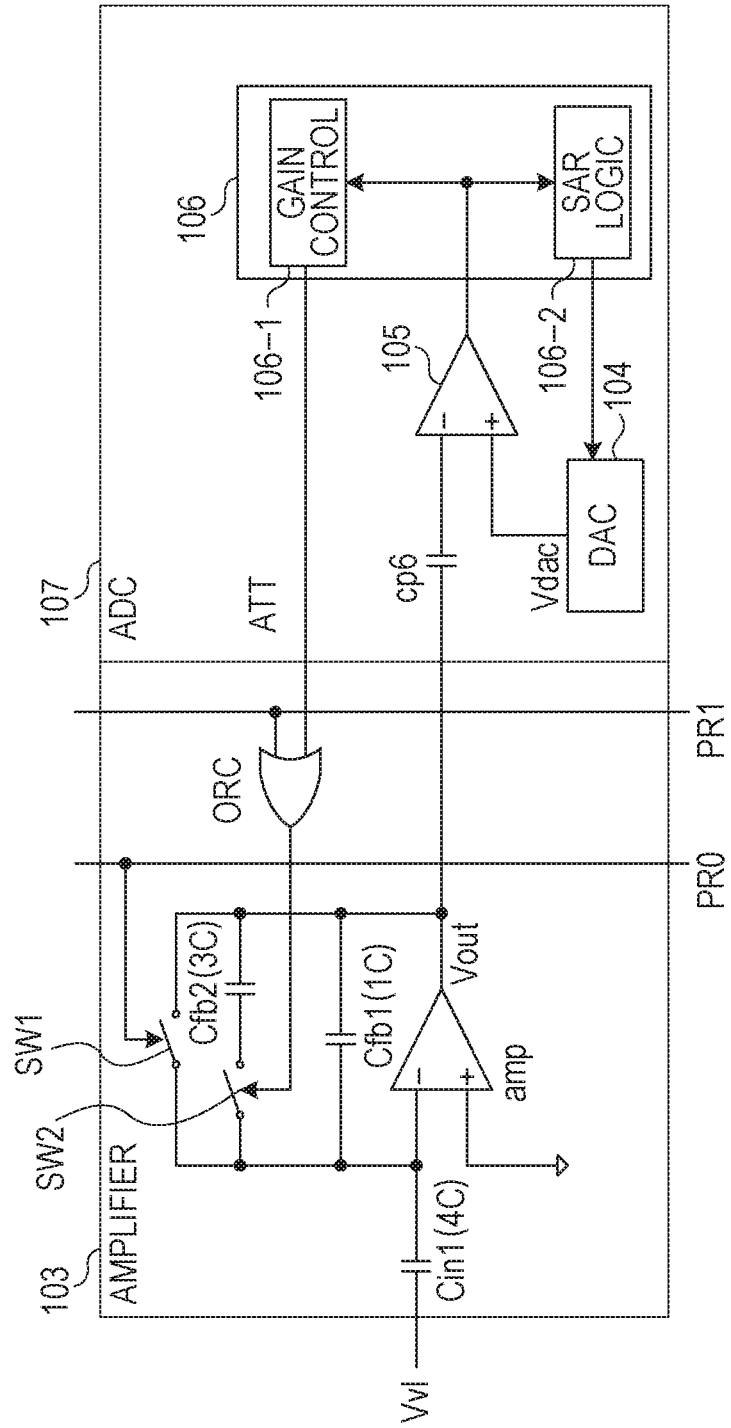
FIG. 6 illustrates configurations of an amplifier and an AD converter.

It should be noted that the control circuit 106 according to the present exemplary embodiment can adopt a configuration illustrated in FIG. 6, for example. The control circuit 106 includes a gain control unit 106-1 (which is referred to as gain control in the drawing) and a logic unit 106-2 (which is referred to as SAR logic in the drawing). The comparator 105 is connected to the gain control unit 106-1 and the logic unit 106-2. The gain control unit 106-1 is connected to the OR circuit ORC. The logic unit 106-2 is connected to the DAC 104. A result of the comparison between the threshold and the amplification signal Vamp which is performed by the comparator 105 is input to the gain control unit 106-1. In a case where the comparison result indicates that the amplification signal Vamp is higher than the threshold, the gain control unit 106-1 sets the signal ATT to the High level. The logic unit 106-2 stores the digital signals of the respective bits and also receives the comparison results corresponding to the respective bits of the comparator 105 to perform the control of the DAC 104.

Second Exemplary Embodiment

Different aspects of the imaging sensor according to the present exemplary embodiment from that of the first exemplary embodiment will be mainly described. The configuration of the imaging sensor according to the present exemplary embodiment can be the same as the imaging sensor according to the first exemplary embodiment. The imaging sensor according to the present exemplary embodiment performs the AD conversion of the amplification signal Vamp at the reset level multiple times. In addition, according to the first exemplary embodiment, the gain of the amplifier 103 for the pixel signal based on the light is determined on the basis of the result of the comparison between the threshold and the amplification signal Vamp. According to the present exemplary embodiment, the gain of the amplifier 103 is changed on the basis of the result of the AD conversion of the amplification signal Vamp. Specifically, in a case where the result of the AD conversion of the amplification signal Vamp is higher than or equal to the predetermined digital signal value, the gain of the amplifier 103 is decreased from ×4 to ×1, and the AD conversion is performed again. That is, according to the present exemplary embodiment, the control circuit 106 compares the digital signal obtained by performing the AD conversion of the amplification signal with the predetermined digital value to detect whether or not the amplification signal is within a predetermined range. On the other hand, in a case where the result of the AD conversion of the amplification signal Vamp is lower than the predetermined digital signal value, the gain of the amplifier 103 is kept at ×4. Then, the AD conversion of the amplification signal Vamp is performed again. With this configuration, the AD conversion of the amplification signal Vamp obtained by amplifying the pixel signal based on the light is performed multiple times.

Figure 7:
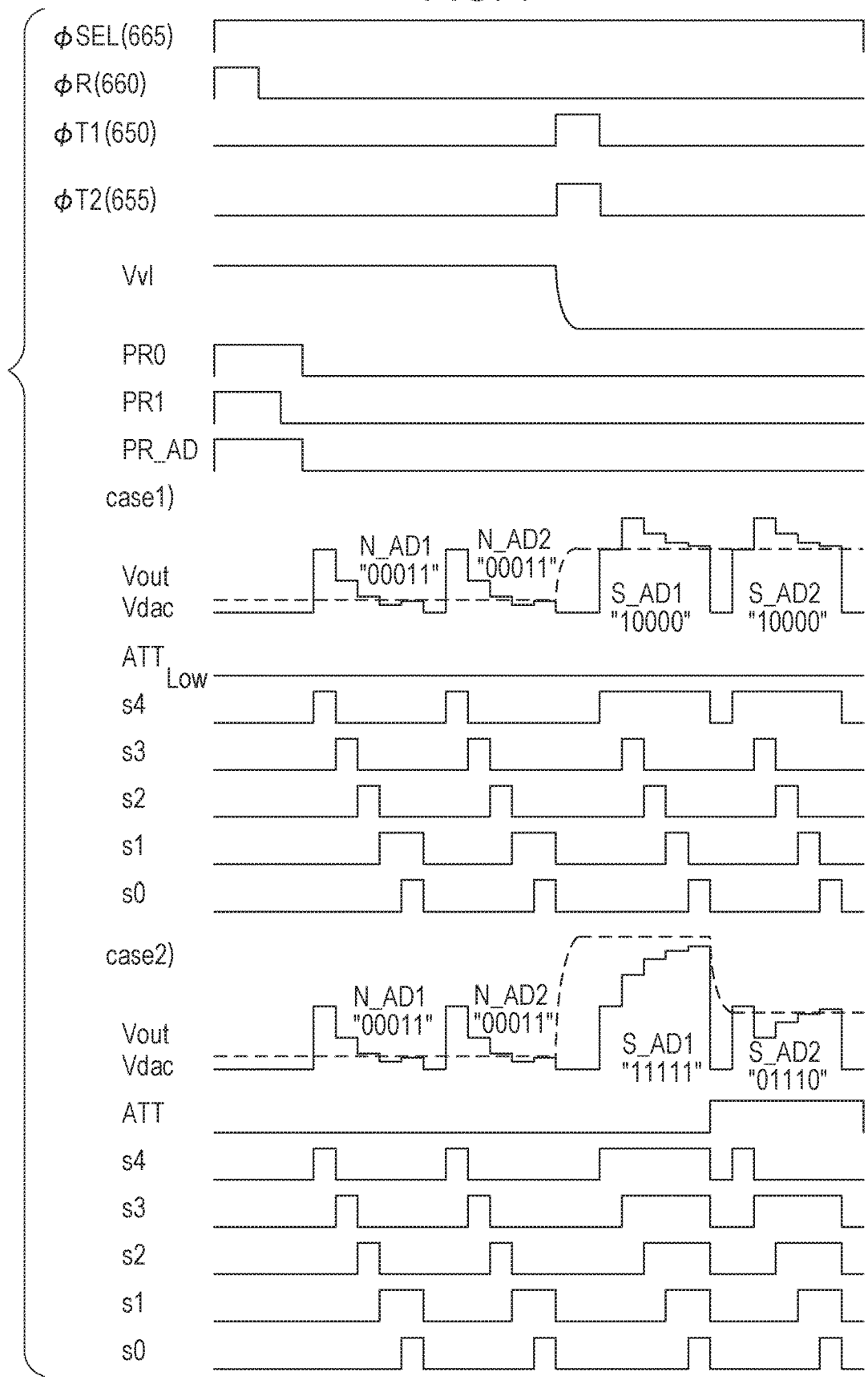
FIG. 7 is a timing chart illustrating the operation of the imaging sensor.

FIG. 7 illustrates an operation of the imaging sensor according to the present exemplary embodiment.

First, operations common to the case 1 and the case 2 will be described.

The operation up until the signals PR0 and PR_AD turns to the Low level is the same as the operation described according to the first exemplary embodiment.

The ADC 107 performs the AD conversion of the amplification signal Vamp at the reset level. The operation of the AD conversion is the same as that of the first exemplary embodiment. In the case of FIG. 7, 00011 is generated as the digital signal corresponding to the amplification signal Vamp at the reset level.

Subsequently, the ADC 107 performs the AD conversion of the amplification signal Vamp at the reset level again. In FIG. 7, to simplify the descriptions, the example has been described in which the digital signals having the same value are generated by both the first AD conversion and the second AD conversion of the amplification signal Vamp at the reset level. Typically, the values of the digital signals obtained by the first AD conversion and the second AD conversion vary due to random noise. When averaging processing of the digital signals obtained by the two AD conversion processes is performed, it is possible to obtain the digital signal in which the random noise is reduced. This averaging processing may be performed inside the imaging sensor or may also be performed outside the imaging sensor.

Next, the vertical scanning circuit 101 sets both the signals φT1 and φT2 to the High level and to be thereafter set to the Low level. With this configuration, the pixel 100 outputs the A+B signal.

Case 1

The case 1 corresponds to an example in which the amplification signal Vamp obtained by amplifying the A+B signal by ×4 is within the signal range in which the AD conversion can be performed by the ADC 107. A digital signal having a value of 10000 is generated as a result of the AD conversion by the same operation as that of the first exemplary embodiment.

In response to a result indicating that the value of the digital signal is lower than 11111, the control circuit 106 keeps the signal ATT at the Low level.

Then, the ADC 107 performs the AD conversion of the amplification signal Vamp obtained by amplifying the A+B signal by the ×4 gain again. With this configuration, the digital signal having the value of 10000 is generated. In FIG. 7, to simplifying the descriptions, the example has been described in which the digital signals having the same value are generated by the first AD conversion and the second AD conversion of the amplification signal Vamp. Typically, the values of the digital signals obtained by the first AD conversion and the second AD conversion differ due to the random noise. When the averaging processing of the digital signals obtained by the two AD conversion processes is performed, it is possible to obtain the digital signal in which the random noise is reduced. This averaging processing may be performed inside the imaging sensor or may also be performed outside the imaging sensor. In particular, in the case 1, a signal amplitude of the A+B signal is smaller than that of the case 2 which will be described below. For this reason, a decrease in a signal-to-noise (S/N) ratio due to the random noise is likely to occur. Therefore, as in the present exemplary embodiment, a plurality of digital signals are generated by performing the AD conversion of the amplification signal Vamp obtained by amplifying the A+B signal multiple times. Then, a configuration is preferably adopted in which the plurality of digital signals are averaged to reduce the random noise.

Case 2

The case 2 corresponds to an example in which the amplification signal Vamp obtained by amplifying the A+B signal by ×4 exceeds the signal range in which the AD conversion can be performed by the ADC 107. As a result of the AD conversion by the same operation as that of the first exemplary embodiment, a digital signal having a value of 11111 is generated. When the digital signal having the value of 11111 is generated, the comparison signal corresponding to the digital signal having the value of 11111 is input to the comparator 105 from the DAC 104.

In response to a result indicating that the value of the digital signal is 11111, the control circuit 106 sets the signal ATT to the High level. With this configuration, the gain of the amplifier amp is changed from ×4 to ×1.

Thereafter, the ADC 107 similarly performs the AD conversion as in the operation of the first exemplary embodiment. With this configuration, the digital signal having the value of 01110 is generated.

In the case 2, the signal amplitude of the A+B signal is larger than that of the case 1. In the above-described case, since the influence on the A+B signal by the random noise is small, the digital signal having a sufficient S/N ratio can be obtained even by the single AD conversion process.

In this manner, the imaging sensor according to the present exemplary embodiment performs the AD conversion multiple times in a case where the signal amplitude of the A+B signal is small. The imaging sensor decreases in the gain of the amplifier 103 in an upstream stage with respect to the ADC 107 and performs the AD conversion in a case where the signal amplitude of the A+B signal is large. In this manner, the imaging sensor according to the present exemplary embodiment can realize both the generation of the signal in which the random noise can be reduced and the gain setting of the amplifier 103 in accordance with the signal amplitude of the pixel signal. With this configuration, it is possible to realize both the noise reduction and the dynamic range expansion.

It should be noted that the case where the gains of the amplifier 103 are ×1 and ×4 has been described in this specification, but the configuration is not limited to this example. Other gains can also be used. The gains of the amplifier 103 in this specification may be ×1 and ×8, for example. In addition, the gain of the amplifier 103 may be selected from among still more gains.

Figure 8:
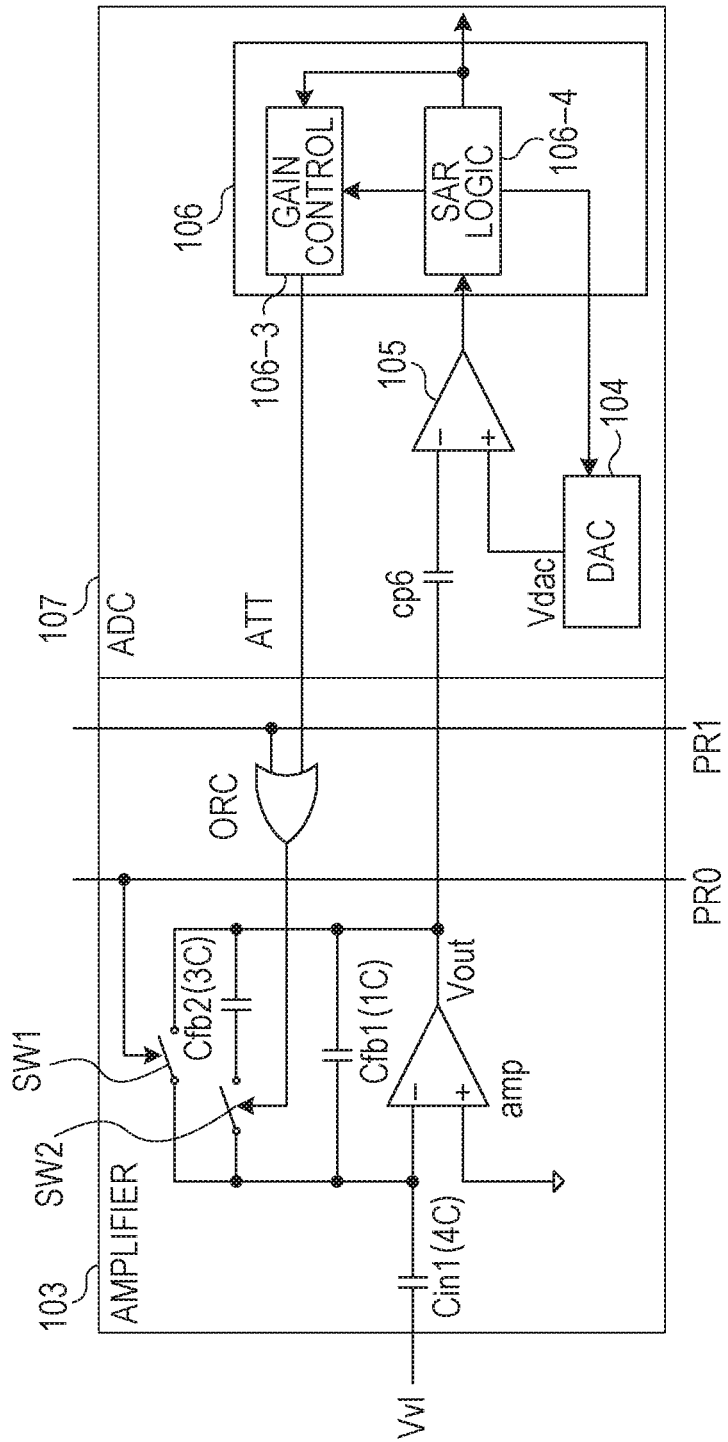
FIG. 8 illustrates configurations of an amplifier and an AD converter.

It should be noted that the control circuit 106 according to the present exemplary embodiment can adopt a configuration illustrated in FIG. 8, for example. The control circuit 106 includes a gain control unit 106-3 (which is referred to as gain control in the drawing) and a logic unit 106-4 (which is referred to as SAR logic in the drawing). The comparator 105 is connected to the logic unit 106-4. The gain control unit 106-3 is connected to the OR circuit ORC. The logic unit 106-4 is connected to the DAC 104. An instruction signal indicating whether or not all the bits of the digital signal obtained by the AD conversion are 1 (that is, a saturated level) is input to the gain control unit 106-3 from the logic unit 106-4. In a case where the instruction signal indicates that all the bits of the digital signal obtained by the AD conversion are 1 (that is, the saturated level), the gain control unit 106-3 sets the signal ATT to the High level. The logic unit 106-4 stores the digital signals of the respective bits and also receives the comparison results corresponding to the respective bits of the comparator 105 to perform the control of the DAC 104.

Third Exemplary Embodiment

The imaging sensor according to the first and second exemplary embodiments is not limited to the imaging sensor formed on a single semiconductor substrate and may also be applied to a stacked imaging sensor.

An exemplary embodiment which will be described below is related to the stacked imaging sensor.

Overall Configuration of the Imaging Sensor

Figure 9:
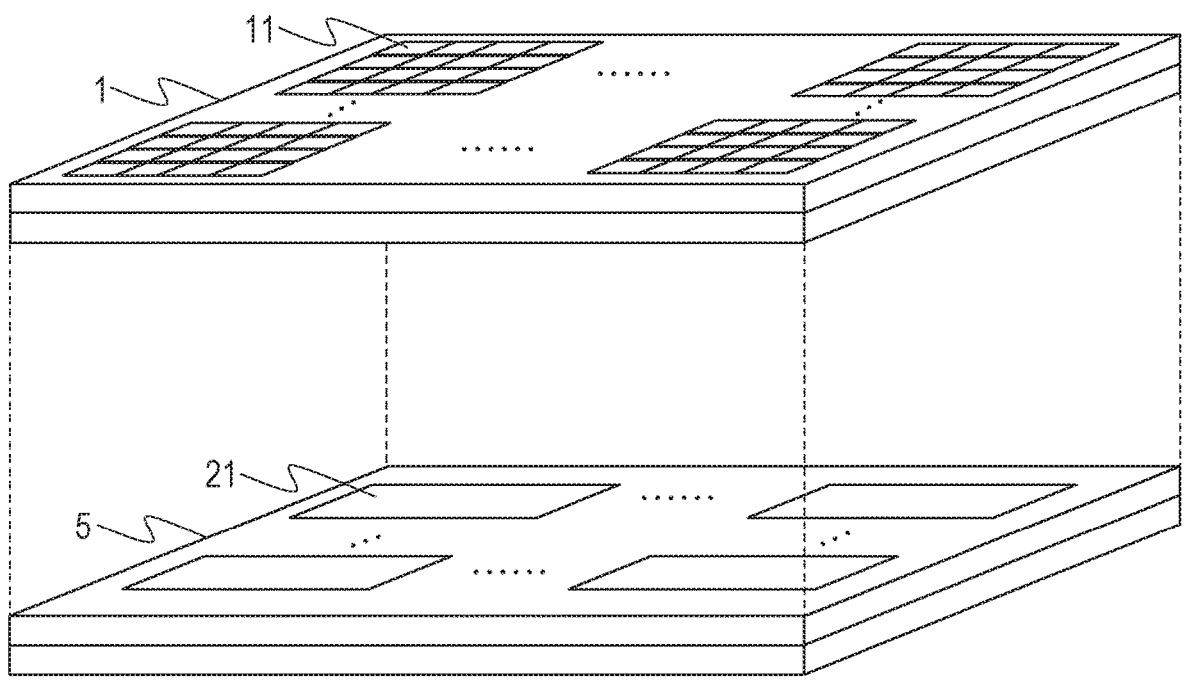
FIG. 9 illustrates a configuration of a stacked imaging sensor.

FIG. 9 illustrates a first chip 1 and a second chip 5 included in the imaging sensor according to the present exemplary embodiment. Pixels 11 are arranged in a plurality of rows and a plurality of columns in the first chip 1. Signal processing circuits 21 are arranged in a plurality of rows and a plurality of columns in the second chip 5. It should be noted that only the pixels 11 and the signal processing circuits 21 are illustrated herein, but in addition, control lines for controlling the pixels 11 and signal lines for transmitting signals output from the pixels 11 are appropriately arranged in the first chip 1. Driving circuits such as a vertical scanning circuit and a timing generator are appropriately arranged in the first chip 1 or the second chip 5.

Figure 10:
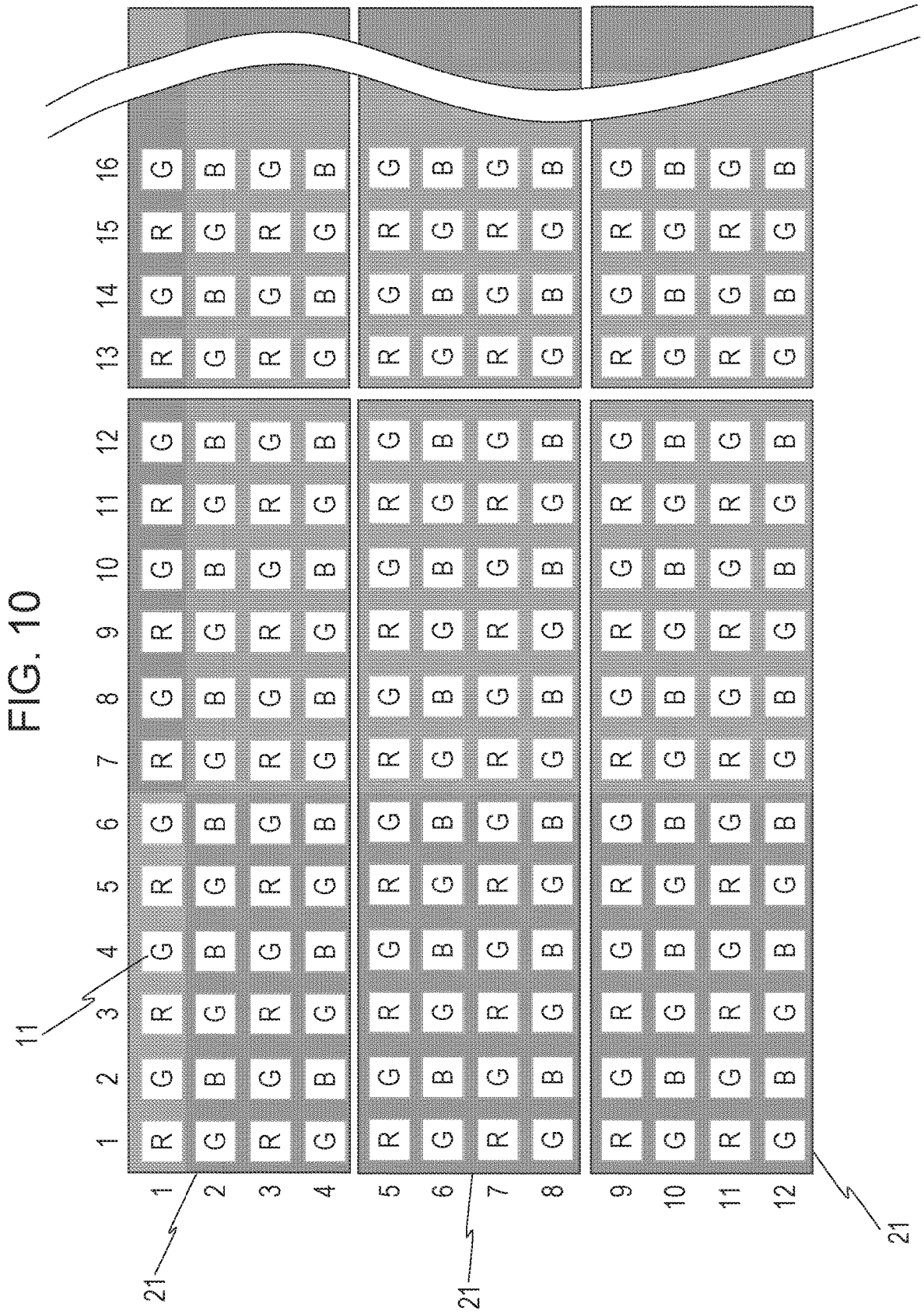
FIG. 10 illustrates an arrangement in a plan view of the stacked imaging sensor.

Arrangement Relationship Between the Pixels and the Signal Processing Circuits in a Plan View FIG. 10 illustrates a layout of the pixels 11 included in the first chip 1 and the signal processing circuits 21 included in the second chip 5 in a plan view. In FIG. 10, colors of color filters included in the pixels 11 are also illustrated. R illustrated in FIG. 10 represents that the pixel 11 includes a color filter of red (R). Similarly, G and B respectively represents that the pixel 11 includes a color filter of green (G) and that the pixel 11 includes a color filter of blue (B). In other words, it can also be mentioned that a pixel on which light having a wavelength corresponding to a first color is incident and a pixel on which light having a wavelength corresponding to a second color is incident are provided. Typically, a wavelength corresponding to red is 600 to 830 nm. A wavelength corresponding to green is 500 to 600 nm. A wavelength corresponding to blue is 360 to 500 nm.

The single signal processing circuit 21 is arranged so as to be overlapped with the pixels 11 arranged in a plurality of rows and a plurality of columns. Herein, the single signal processing circuit 21 is arranged so as to be overlapped with the pixels 11 arranged in 4 rows and 12 columns. As will be described below, the signal processing circuit 21 includes a multiplex circuit, an amplifier, and an AD converter. Therefore, it can be mentioned that part or all of the multiplex circuit, the amplifier, and the AD converter of the single signal processing circuit 21 are arranged so as to be overlapped with the pixel 11. The amplifier 103 described according to the first and second exemplary embodiments can be applied to the amplifier. The ADC 107 described according to the first and second exemplary embodiments can be applied to the AD converter.

In addition, as will be described below, the AD converter of the single signal processing circuit 21 performs the AD conversion of the signal output by the pixel 11 including the color filter of the first color but does not perform the AD conversion of the signal output by the pixel 11 including the color filter of the second color. Therefore, the amplifier of the single signal processing circuit 21 has such a relationship that the amplifier is overlapped with both the pixel 11 set as a target where the AD conversion is performed and the pixel 11 set as a target where the AD conversion is not performed in the plan view.

It should be noted that this arrangement is an example, and according to the present exemplary embodiment, it is possible to adopt a mode in which the plurality of pixels 11 are arranged with respect to the single signal processing circuit 21.

Equivalent Circuit of the Imaging Sensor

Figure 11:
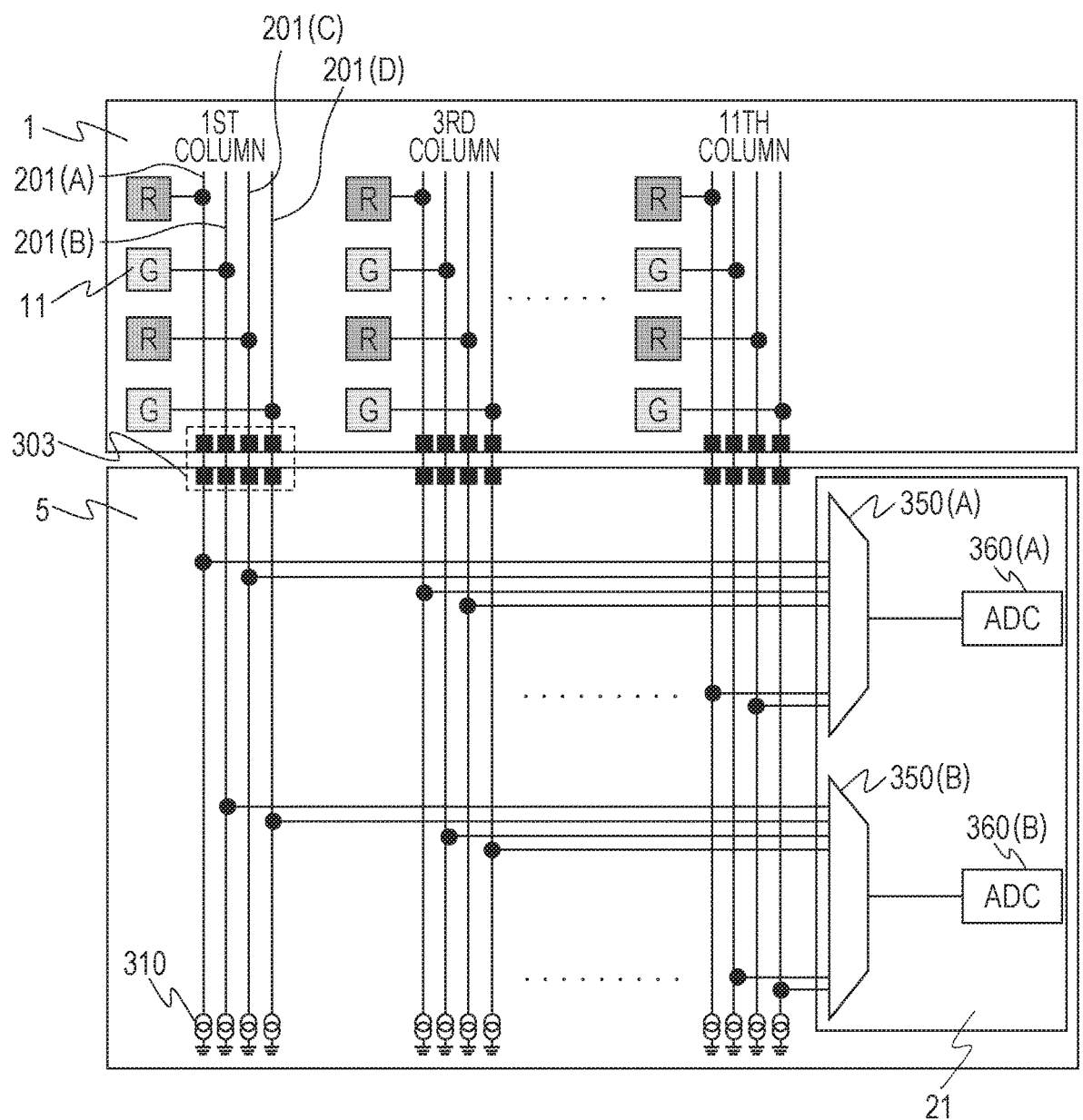
FIG. 11 illustrates a configuration of the imaging sensor.

FIG. 11 illustrates only the pixels 11 in odd-numbered columns among the pixels 11 illustrated in FIG. 10. With regard to the pixels 11 in the first chip 1, four signal lines 201(A) to 201(D) are arranged with respect to the pixels 11 in a single column. It should be noted that the signal lines 201(A) to 201(D) will be hereinafter referred to as the signal line 201 in a case where the signal lines 201(A) to 201(D) are not distinguished from one another. The pixels 11 in the first row are connected to the signal line 201(A). Similarly, the pixels 11 in the second to fourth rows are connected to the signal lines 201(B) to 201(D) in the stated order. The signal lines 201(A) to 201(D) are also arranged in the other columns as in the pixels 11 in the first column.

Each of the signal lines 201(A) and 201(C) is connected to the signal processing circuit 21(A) via a connection part 303. Each of the signal lines 201(B) and 201(D) is connected to the signal processing circuit 21(B) via the connection part 303. The signal processing circuit 21(A) and the signal processing circuit 21(B) have the same circuit configuration. For this reason, in the case of descriptions common to both the signal processing circuits, alphabets are omitted. Hereinafter, the configuration of the signal processing circuit 21 will be described.

FIG. 11 also illustrates an equivalent circuit of the signal processing circuit 21. The plurality of signal lines 201 are respectively connected to multiplex circuits (hereinafter, which will be referred to as MPX circuits) 350 included in the signal processing circuit 21 via the connection parts 303. The signal processing circuit 21 includes an amplifier 355 and an AD converter (hereinafter, which will be referred to as an ADC in the specification and drawings) 360. An output of the MPX circuit 350 is connected to the ADC 360 via the amplifier 355. Therefore, the MPX circuit 350 is a selection part where one of the plurality of signal lines 201 is selected to be connected to the ADC 360(A).

The amplifier 355 is an operational amplifier, for example. The amplifier 355 includes an inverting input terminal and a non-inverting input terminal. One of the two input terminals is connected to the MPX circuit 350. The other one of the two input terminals is supplied with a reference voltage Vref. In the example of FIG. 11, the reference voltage Vref is supplied via a capacitance. A resetting switch is connected to the capacitance. Two output terminals of the amplifier 355 are respectively connected to the ADC 360. The two output terminals of the amplifier 355 are respectively connected to the inverting input terminal and the non-inverting input terminal via a feedback capacitance. An initialization switch is connected in parallel with the feedback capacitance in each feedback route. The amplifier 355 has a gain higher than 1. For example, the amplifier 355 can select the ×1 gain and the ×4 gain.

As illustrated in FIG. 11, all the pixels 11 connected to the ADC 360(A) are the pixels 11 including the color filter of R. On the other hand, all the pixels 11 connected to the ADC 360(B) are the pixels 11 including the color filter of G. In this manner, the plurality of first pixels 11 each of which includes the color filter of the first color (R) are connected to the ADC 360(A) serving as the first AD converter without being connected to the ADC 360(B) serving as the second AD converter. The plurality of first pixels 11 each of which includes the color filter of the second color (G) are connected to the ADC 360(B) serving as the second AD converter without being connected to the ADC 360(A) serving as the first AD converter.

In addition, as illustrated in FIG. 11, the second chip 5 includes current sources 310. The current sources 310 supply currents to the signal lines 201 in the respective columns via the connection part 303.

Cross-Sectional Structure Around the Connection Part of the Imaging Sensor

Figure 12:
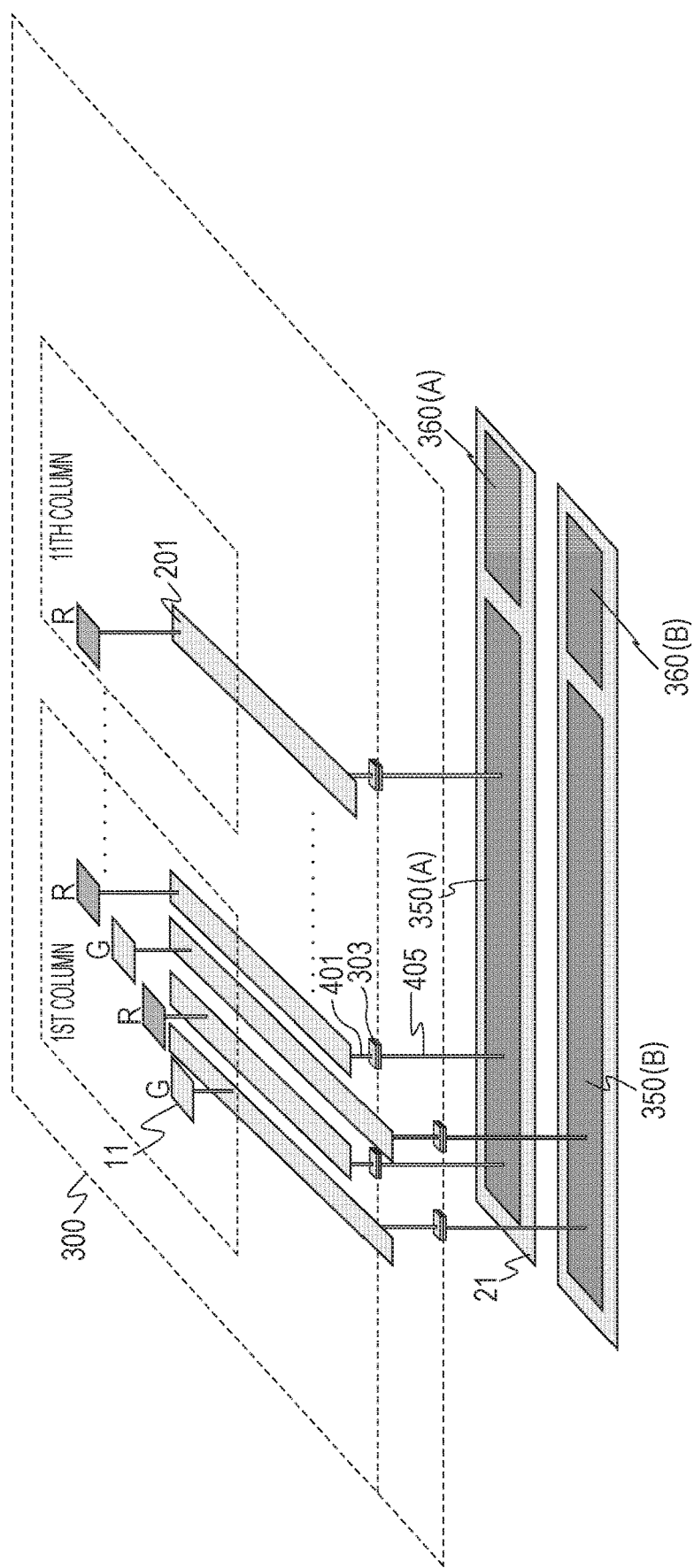
FIG. 12 illustrates a cross-sectional configuration of the imaging sensor.

FIG. 12 illustrates a cross-sectional structure of the imaging sensor illustrated in FIG. 11. FIG. 12 mainly illustrates the pixels 11 arranged in four rows and one column and the pixels 11 in the first row and the eleventh column. The first chip 1 and the second chip 5 illustrated in FIG. 9 are bonded to each other on a bonding plane 300.

Figure 13:
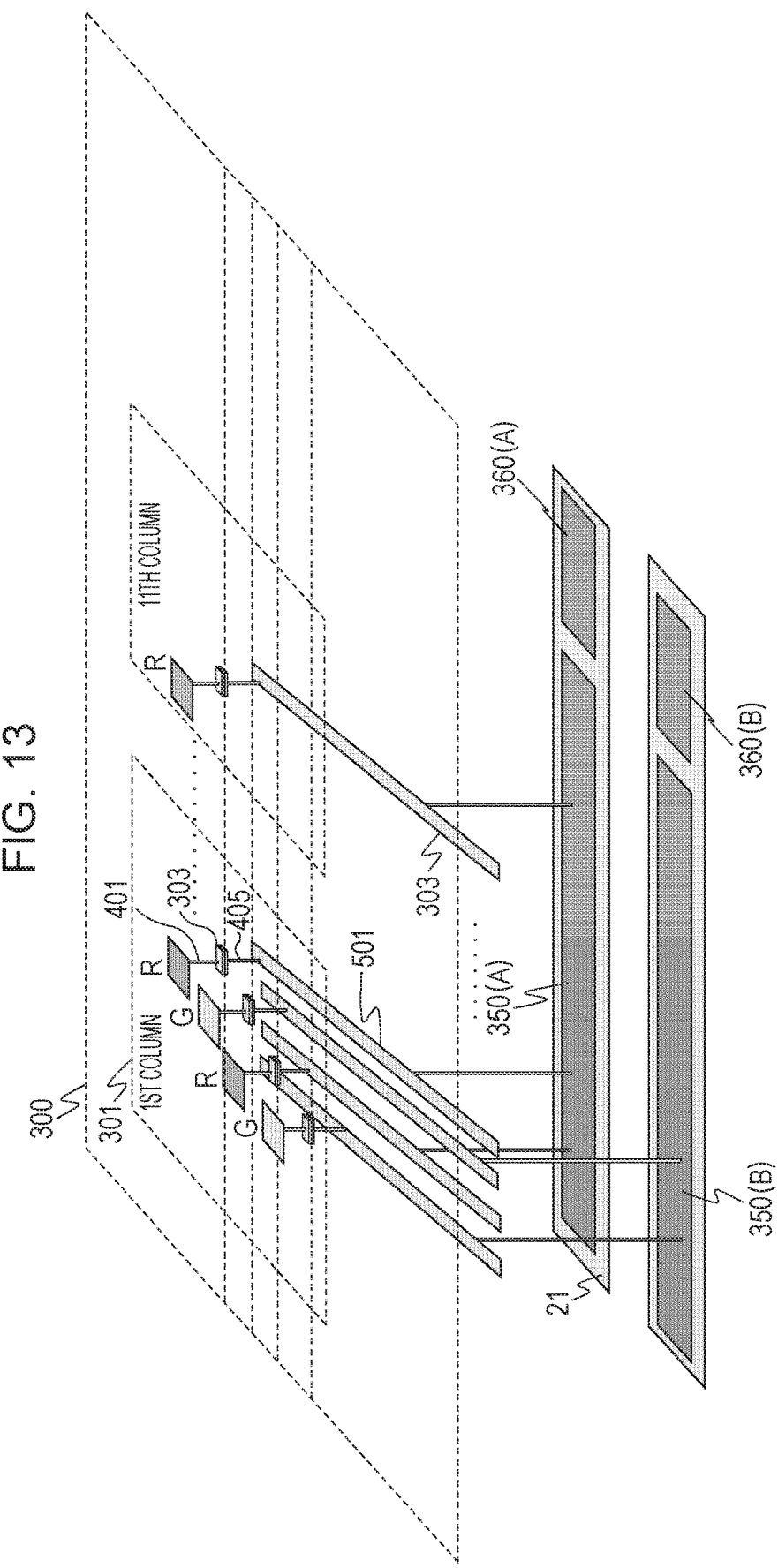
FIG. 13 illustrates a cross-sectional configuration of the imaging sensor.

The imaging sensor according to the present exemplary embodiment is a back-side illuminated imaging sensor. The pixel 11 includes a photoelectric conversion unit which is not illustrated in the drawing. The signal line 201 is arranged between the photoelectric conversion unit and the bonding plane 300. The signal line 201 extends in a predetermined direction (direction along the columns in the drawing) of the pixel 11. The signal line 201 is connected to the connection part 303 via a connecting wiring 401. The MPX circuit 350(A) is connected to the connection part 303 via a connecting wiring 405. The connecting wiring 401, the connecting wiring 405, and the connection part 303 are arranged so as to be overlapped with one another in the plan view. It may be mentioned that the connection between the signal processing circuit 21 and the signal line 201 can be established by forming the connecting wiring 401 at a position overlapped with the connecting wiring 405 in the plan view. When the signal line 201 extending in the predetermined direction and the connecting wiring 401 are connected to each other, the signal line 201 can be connected to the MPX circuit 350. Since the signal line 201 extends in the predetermined direction, it is possible to facilitate the connection between the connecting wiring 401 and the signal line 201. As another example, as illustrated in FIG. 13, it is conceivable that a signal line 501 extending in the predetermined direction is arranged in the second chip 5 instead of the first chip 1. In this case too, the pixel 11 can be connected to the MPX circuit 350(A). However, the signal line extending in the predetermined direction which is illustrated in FIG. 12 is preferably arranged in the first chip 1 as compared with the configuration of FIG. 13. This is derived from a state in which the number of wiring layers of the second chip 5 including the signal processing circuits 21 is higher than that of the first chip 1 including the pixels 11. This is because a degree of freedom for designing is high when the signal lines 201 as illustrated in FIG. 12 are arranged in the first chip 1 where the number of wiring layers is low instead of arranging the signal lines 501 as illustrated in FIG. 13 in the second chip 5 where the number of wiring layers is high.

Operation of the Imaging Sensor

FIGS. 14A and 14B illustrate an operation of the imaging sensor.

A signal PRES of FIGS. 14A and 14B denotes a signal supplied from the vertical scanning circuit to the gate of the reset transistor 606 via the control line 660 of FIG. 2. Similarly, a signal PSEL denotes a signal supplied from the vertical scanning circuit to the gate of the selection transistor 608 in the N-th row of the pixel 11 via the control line 665. It should be noted that the signal PSEL is illustrated while a row position of the pixel 11 where the output is performed is matched with the suffix. That is, the signal PSEL(1) denotes the signal PSEL output to the pixels 11 in the first row. A signal PTXA denotes a signal supplied from the vertical scanning circuit to the gate of the transfer transistor 603a via the control line 650. A signal PTXB denotes a signal supplied from the vertical scanning circuit to the gate of the transfer transistor 603b via the control line 655.

In FIGS. 14A and 14B, operations related to the MPX circuit 350(A) and the ADC 360(A) are illustrated. As illustrated in FIG. 11, the signals of the pixels 11 including the color filters of R which are located in the first row and the third row and the odd-numbered columns among the first to twelfth columns are input to the MPX circuit 350(A) and the ADC 360(A). Therefore, in FIGS. 14A and 14B, operations related to the operations of the pixels 11 located in the first row and the third row and the odd-numbered columns among the first to twelfth columns are illustrated.

A signal MPX illustrated in FIGS. 14A and 14B denotes a signal output by the timing generator which is not illustrated in the drawing to the MPX circuit 350(A). The MPX circuit 350(A) sequentially changes signals output to the amplifier 355(A) and the ADC 360(A) from among the signal lines 201 corresponding to the pixels 11 the odd-numbered columns among the first to twelfth columns by a change in the signal value of the signal MPX. Hereinafter, a state in which the MPX circuit 350 outputs the signal to the amplifier 355, and the amplifier 355 then outputs the amplified signal to the ADC 360 will be also simply rephrased as follows. That is, the MPX circuit 350 outputs the signal to the ADC 360.

In FIGS. 14A and 14B, a column selected by the MPX circuit 350(A) as a column where the signal is output to the ADC 360(A) is referred to as Col_nm. This notation of nm will be described. Herein, n denotes a column number of the pixels 11. On the other hand, m denotes an alphabet of the signal lines 201(A) to 201(D) arranged so as to correspond to the pixels 11 in a single column. That is, Col_1A denotes the signal line 201(A) corresponding to the pixels 11 in the first column.

At a time t1, the vertical scanning circuit sets the signal PRES output to the pixels 11 in the first row and the third row to the High level. With this configuration, the reset transistor 606 of the pixels 11 in the first row turns on. Therefore, the FD unit 605 is reset to a potential corresponding to the power supply voltage Vdd. In addition, at the time t1, the vertical scanning circuit sets the signal PSEL(1) to the High level. With this configuration, the selection transistor 608 for the pixels 11 in the first row turns on. Therefore, the current supplied by the current source 310 illustrated in FIG. 11 is supplied to the amplification transistor 607 via the selection transistor 608 for the pixels 11 in the first row. With this configuration, a source follower circuit based on the power supply voltage Vdd, the amplification transistor 607, and the current source 310 is formed. That is, the amplification transistor 607 performs the source follower operation for outputting the signal corresponding to the potential of the FD unit 605 to the signal line 201 via the selection transistor 608.

Operation: Readout of the N Signal Corresponding to the Pixels 11 in the First Row At a time t2, the vertical scanning circuit sets the signal PRES output to the pixels 11 in the first row to the Low level. With this configuration, the reset transistor 606 of the pixels 11 in the first row turns off. Therefore, the reset of the FD unit 605 is cancelled. The amplification transistor 607 outputs the signal based on the potential of the FD unit 605 where the reset is cancelled to the signal line 201(A) illustrated in FIG. 11. This signal is referred to as a N signal (noise signal). With this configuration, the N signal is output from the pixel 11 to the signal line 201(A) in each column.

Operation: AD Conversion of the N Signal Corresponding to the Pixels 11 in the First Row At the time t2 and subsequent times, the MPX circuit 350(A) sequentially connects the signal lines 201(A) corresponding to the pixels 11 in the odd-numbered columns among the first to twelfth columns to the ADC 360(A) on the basis of the signals MPX supplied from the timing generator.

The ADC 360(A) performs the AD conversion of the noise signal of the signal line 201(A) in the first column output from the MPX circuit 350(A) into the digital signal. Thereafter, the AD conversion of the noise signals output to the signal lines 201(A) corresponding to the pixels 11 in the odd-numbered columns among the first to twelfth columns into the digital signals is sequentially performed.

Operation: Readout of the N Signal Corresponding to the Pixels 11 in the Third Row At a time t16, the vertical scanning circuit sets the signal output to the pixels 11 in the third row to the Low level. With this configuration, the reset transistor 606 of the pixels 11 in the third row turns off. Therefore, the reset of the FD unit 605 is cancelled. The amplification transistor 607 outputs the N signal corresponding to the signal based on the potential of the FD unit 605 where the reset is cancelled to the signal line 201(C) illustrated in FIG. 11. With this configuration, the noise signal is output from the pixel 11 to the signal line 201(C) in each column.

Operation: AD Conversion of the N Signal Corresponding to the Pixels 11 in the Third Row At the time t16 and subsequent times, the MPX circuit 350(A) sequentially connects the signal lines 201(C) corresponding to the pixels 11 in the odd-numbered columns among the first to twelfth columns to the ADC 360(A) on the basis of the signals MPX supplied from the timing generator.

The ADC 360(A) performs the AD conversion of the N signal of the signal line 201(C) in the first column which is output from the MPX circuit 350(A) into the digital signal. Thereafter, the AD conversion of the N signals output to the signal lines 201(C) corresponding to the pixels 11 in the odd-numbered columns among the first to twelfth columns into the digital signal is sequentially performed.

Operation: Readout of the A+B Signal Corresponding to the Pixels 11 in the First Row At the time t16, the vertical scanning circuit sets the signals PTXA and PTXB output to the pixels 11 in the first row to the High level. With this configuration, charges (electrons according to the present exemplary embodiment) accumulated by the photodiodes 601a and 601b are transferred to the FD unit 605 via the transfer transistors 603a and 603b. In the FD unit 605, the respective charges of the photodiodes 601a and 601b are added to each other. With this configuration, the FD unit 605 takes a potential corresponding to charges obtained by adding the respective charges of the photodiodes 601a and 601b to each other. It is supposed that a signal output by the amplification transistor 607 on the basis of the potential of the FD unit 605 based on the charges of only the photodiode 601a is set as an A signal. On the other hand, it is supposed that a signal output by the amplification transistor 607 on the basis of the potential of the FD unit 605 based on the charges of only the photodiode 601b is set as a B signal. According to this notation, the signal output by the amplification transistor 607 on the basis of the potential of the FD unit 605 corresponding to the charges obtained by the respective charges of the photodiodes 601a and 601b to each other can be regarded as an A+B signal obtaining by adding the A signal and the B signal to each other. The A+B signal of the pixels 11 in the first row is output to the signal line 201(A) in each column.

AD Conversion of the A+B Signal Corresponding to the Pixels 11 in the First Row

At a time t30 and subsequent times, the MPX circuit 350(A) sequentially connects the signal lines 201(A) corresponding to the pixels 11 in the odd-numbered columns among the first to twelfth columns to the ADC 360(A) on the basis of the signals MPX supplied from the timing generator.

The ADC 360(A) performs the AD conversion of the A+B signal of the signal line 201(A) in the first column which is output from the MPX circuit 350(A) into the digital signal. Thereafter, the AD conversion of the A+B signal output to the signal lines 201(A) corresponding to the pixels 11 in the odd-numbered columns among the first to twelfth columns into the digital signals is sequentially performed.

Operation: Readout of the A+B Signal Corresponding to the Pixels 11 in the Third Row At the time t30, the vertical scanning circuit sets the signals PTXA and PTXB output to the pixels 11 in the third row to the High level. With this configuration, the A+B signal of the pixels 11 in the third row is output to the signal line 201(C) in each column.

Operation: AD Conversion of the A+B Signal Corresponding to the Pixels 11 in the Third Row At a time t44 and subsequent times, the MPX circuit 350(A) sequentially connects the signal lines 201(C) corresponding to the pixels 11 in the odd-numbered columns among the first to twelfth columns to the ADC 360(A) on the basis of the signals MPX supplied from the timing generator.

The ADC 360(A) performs the AD conversion of the A+B signal of the signal line 201(C) in the first column which is output from the MPX circuit 350(A) into the digital signal. Thereafter, the AD conversion of the A+B signals output to the signal lines 201(C) corresponding to the pixels 11 in the odd-numbered columns among the first to twelfth columns into the digital signals is sequentially performed.

Parallel Operation Performed by the Imaging Sensor

In the operations illustrated in FIGS. 14A and 14B, a plurality of operations are performed in parallel as will be described below.

(1) The parallel operations of the AD conversion of the N signal corresponding to the pixels 11 in the first row and the readout of the N signal corresponding to the pixels 11 in the third row (2) The parallel operations of the AD conversion of the N signal corresponding to the pixels 11 in the third row and the read out of the A+B signal corresponding to the pixels 11 in the first row (3) The parallel operations of the AD conversion of the A+B signal corresponding to the pixels 11 in the first row and the readout of the A+B signal corresponding to the pixels 11 in the third row With the parallel operation, it is possible to shorten a standby time until the ADC 360(A) performs the next AD conversion after the single AD conversion is ended. With this configuration, it is possible to shorten a period of time used for the AD conversion of the signals output from all the pixels 11. Therefore, it is possible to develop a higher frame rate of the imaging sensor.

Advantages of the Present Exemplary Embodiment

In the imaging sensor according to the present exemplary embodiment, the signal processing circuit 21 includes the amplifier 355. For this reason, the signal is amplified before the noise generated by the ADC 360 is superimposed. As a result, the SN ratio can be improved.

Other Modes

According to the present exemplary embodiment, the example in which the signal line 201, to which the pixels 11 including the color filter of the first color are connected but to which the pixels 11 including the color filter of the second color are not connected, is connected to the ADC 360 has been described. In this example, a mode is adopted in which a connection part where the ADC 360 and the pixels 11 including the color filter of the second color are connected to each other is not arranged.

Fourth Exemplary Embodiment

Different aspects of the present exemplary embodiment from the third exemplary embodiment will be mainly described. In the imaging sensor according to the present exemplary embodiment, the configuration of the signal processing circuit 21 is different from that of the signal processing circuit 21 according to the third exemplary embodiment. Specifically, the signal processing circuit 21 according to the present exemplary embodiment includes two multiplex circuits and a plurality of amplifiers arranged in parallel between the multiplex circuits. The other configuration can be the same as the configuration of the imaging sensor according to the third exemplary embodiment. Hereinafter, different aspects from the third exemplary embodiment will be mainly described.

Figure 15:
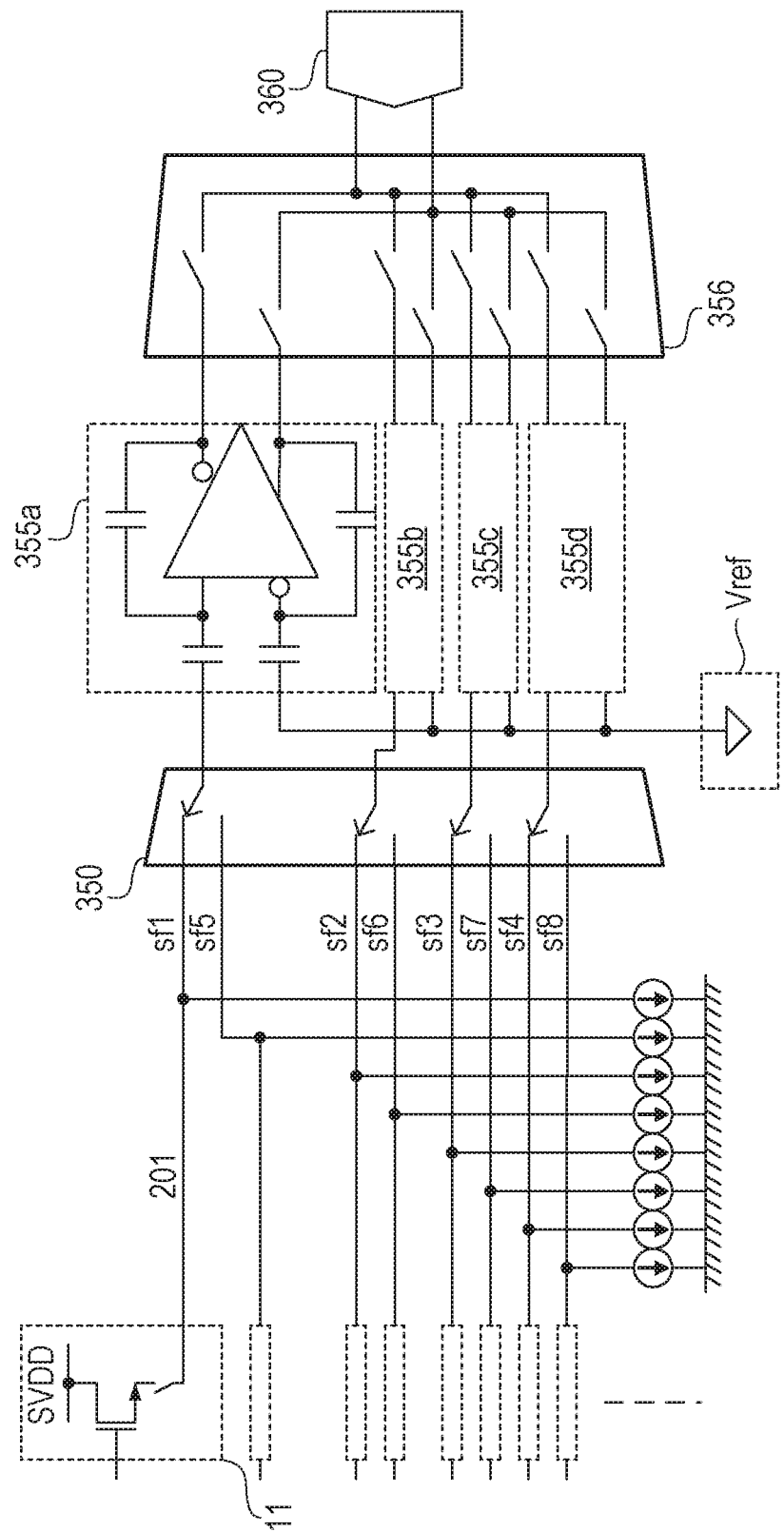
FIG. 15 illustrates a configuration of the imaging sensor.

FIG. 15 is an equivalent circuit of the signal processing circuit 21 of the imaging sensor according to the present exemplary embodiment. The point in which signal processing circuit 21 includes the MPX circuit 350 and the ADC 360 is similar to the third exemplary embodiment. It should be noted that reference signs sf1 to sf8 are assigned to inputs of the MPX circuit 350 in FIG. 15. The number of inputs of the MPX circuit 350 in FIG. 15 is eight, but the number of inputs is not particularly limited.

The MPX circuit 350 includes four output nodes. The amplifier 355 is connected to each of the output nodes of the MPX circuit 350. The signal processing circuit 21 includes four amplifiers 355a to 355d. The MPX circuit 350 selects one of the input sf1 and the input sf5 and outputs the selected input signal to the amplifier 355a. The MPX circuit 350 selects one of the input sf2 and the input sf5 and outputs the selected input signal to the amplifier 355b. The same also applies to the other inputs. The signal output from the MPX circuit 350 is input to one of the inverting input terminal and the non-inverting terminal in each of the amplifier 355 via the capacitance. The reference signal Vref is input to the other one of the inverting input terminal and the non-inverting terminal in each of the amplifier 355. The common reference signal Vref may be supplied to the plurality of amplifiers 355.

The outputs of the plurality of amplifiers 355 are connected to a common multiplex circuit 356 (hereinafter, which will be referred to as an MPX circuit 356). The MPX circuit 356 selects one of the outputs of the plurality of amplifiers 355 and outputs the selected signal to the ADC 360. The MPX circuit 356 selects one of the signals from the inverting output terminals of the plurality of amplifiers 355. In addition, the MPX circuit 356 selects one of the signals from the non-inverting output terminals of the plurality of amplifiers 355.

It should be noted that, as illustrated in FIG. 15, the number of inputs to the MPX circuit 356 is lower than the number of inputs to the MPX circuit 350. In addition, the number of the plurality of amplifiers 355 is lower than the number of inputs to the MPX circuit 350.

In this manner, according to the present exemplary embodiment, the plurality of amplifiers 355 are connected in parallel between the two selection circuits (the MPX circuit 350 and the MPX circuit 356). With the above-described configuration, it is possible to increase the speed of the signal output.

Figure 16:
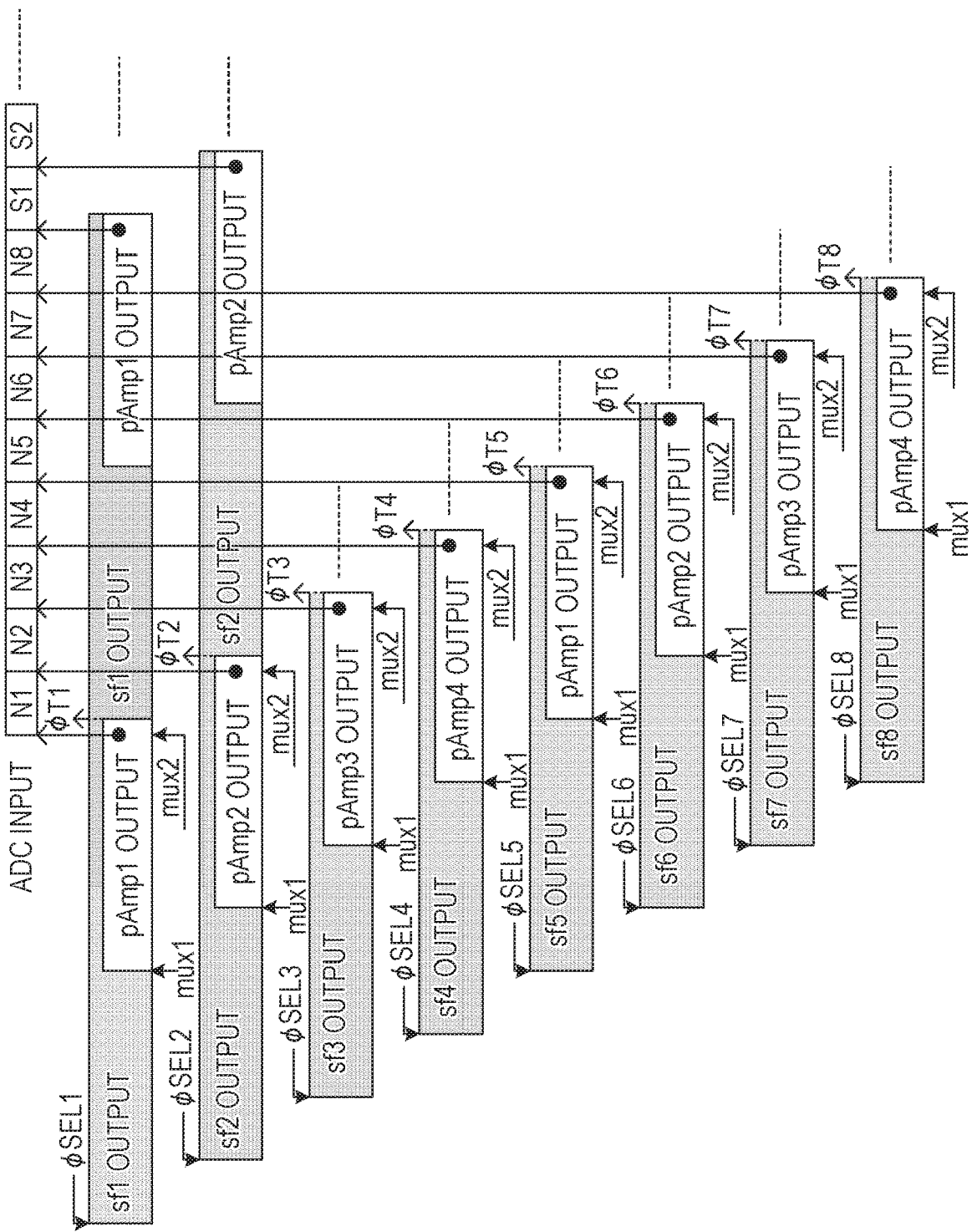
FIG. 16 illustrates an operation of the imaging sensor.

The operation of the signal processing circuit 21 according to the present exemplary embodiment will be described with reference to FIG. 16. FIG. 16 schematically illustrates an processing operation with respect to the signal for each of the signal lines 201.

Signal processing of the signal line 201 connected to the input sf1 will be described. First, when the signal φSEL1 turns on, the pixel signal is output from the source follower circuit of the pixel 11 to the signal line 201 connected to the input sf1. Thereafter, at a timing mux1, the MPX circuit 355a selects the input sf1 and then outputs the signal of the input sf1 to the amplifier 355a in a downstream stage. At a timing when the output of the amplifier 355a is stabilized (mux2), the MPX circuit 356 outputs the output of the amplifier 355a to the ADC 360 in a downstream stage. The ADC 360 performs the AD conversion with respect to the pixel signal amplified by the amplifier 355a. FIG. 16 illustrates an example of the AD conversion of the N signal.

After a predetermined time has elapsed since the signal φSEL1 turns on, the signal φSEL5 turns on. With this configuration, the pixel signal is output from the source follower circuit of the pixel 11 to the signal line 201 connected to the input sf5. Thereafter, at the timing mux1, the MPX circuit 350 selects the input sf5 and then outputs the signal of the input sf5 to the amplifier 355a in a downstream stage. In this manner, since a certain signal is input to one amplifier 355 until the next signal is input, a period of time elapses until the output of the previous signal of the amplifier 355 is stabilized.

Herein, according to the present exemplary embodiment, the plurality of amplifiers 355 are connected in parallel in a downstream stage of the MPX circuit 350. For this reason, the signal can be input to another amplifier 355 during the period of time elapses until the output of the previous signal of one amplifier 355 is stabilized. Specifically, during a period since the signal φSEL1 turns on until the signal φSEL5 turns on, the signals φSEL2 to φSEL4 turn on. With this configuration, the MPX circuit 350 sequentially outputs the signals of the inputs sf2 to sf4 to the amplifiers 355b to 355d. As a result, it is possible to increase the speed of the operation for outputting the plurality of signals.

As illustrated in FIG. 16, the signals φSEL1 to φSEL8 for controlling the selection transistors sequentially turn on in the plurality of pixels 11 connected to the single MPX circuit 350. An interval for the MPX circuit 350 to switch one output is longer than an interval for the signals φSEL1 to φSEL8 to turn on. For example, an interval between the timing mux1 with respect to the input sf1 and the timing mux1 with respect to the input sf5 is longer than an interval since the signal φSEL1 turns on until the signal φSEL2 turns on. With this configuration, the time is secured for the outputs of the respective circuits in the transmission path of the pixel signal to be sufficiently stabilized.

From another viewpoint, the selection circuit (the MPX circuit 356) is arranged in a downstream stage of the amplifier 355. With this configuration, it is possible to reduce the influence of the noise generated in the selection circuit. As a result, the image quality can be improved.

Figure 17:
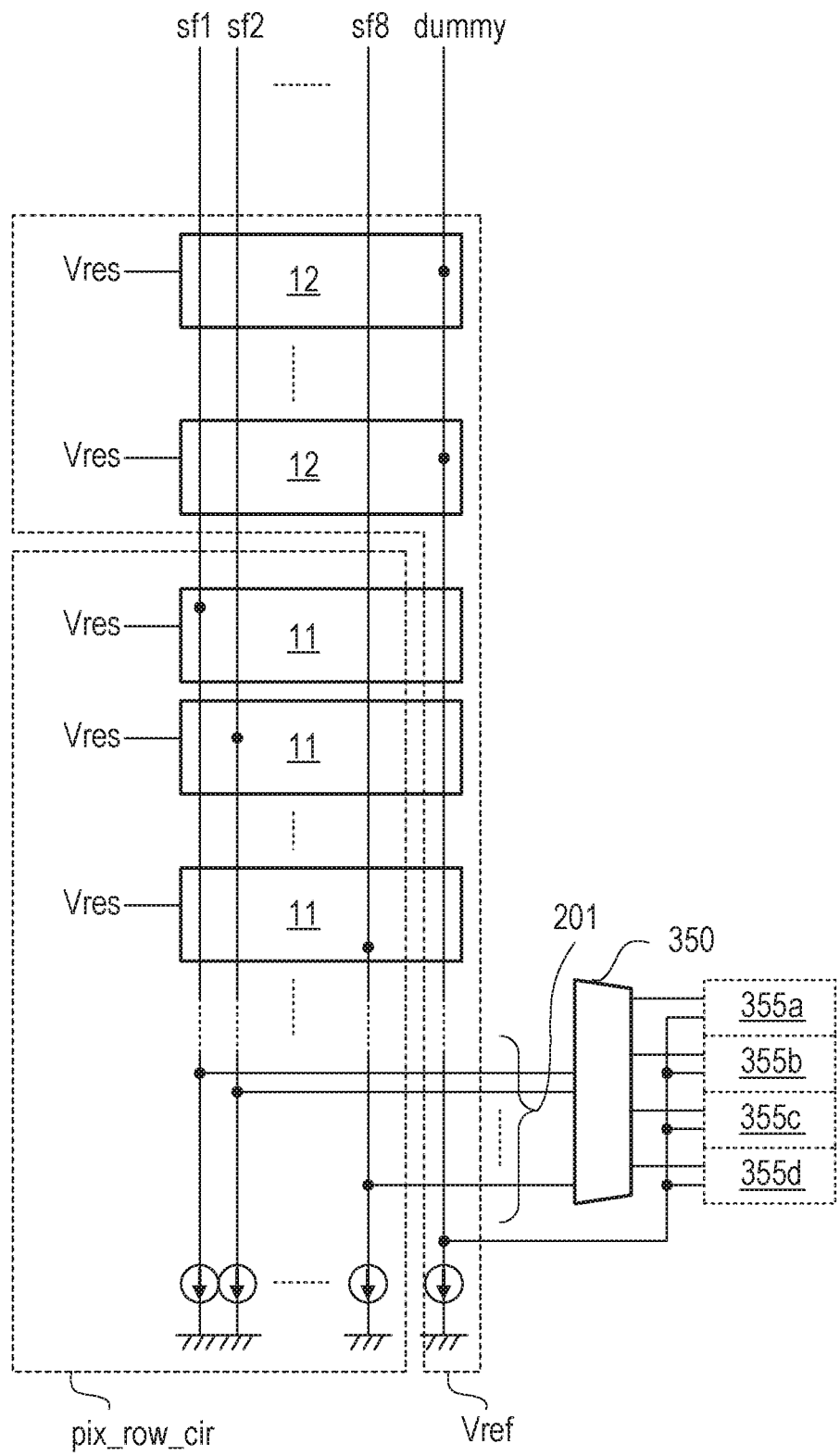
FIG. 17 illustrates a configuration of the imaging sensor.

Next, a modified example of the present exemplary embodiment will be described. FIG. 17 illustrates a connection between the pixels and the signal processing circuits of the imaging sensor. The imaging sensor of FIG. 17 includes dummy pixels 12 (reference pixels) that output the reference signal Vref. The respective dummy pixels are connected to an output line denoted as dummy. The current source is connected to the output line dummy. Similarly as in the pixel 11, the dummy pixel 12 includes the amplification transistor 607. For this reason, the amplification transistor 607 and the current source connected to the output line dummy form a source follower circuit. A voltage supply unit configured to supply a reference voltage is arranged in the dummy pixel 12 instead of the photoelectric conversion unit. With the above-described configuration, the dummy pixel 12 can output the reference voltage Vref.

When the dummy pixel 12 outputs the reference voltage Vref, crosstalk generated between the plurality of signal lines 201 can be cancelled out. In addition, when the dummy pixels 12 are arranged in a plurality of columns and also the outputs of the dummy pixel 12 are mutually shorted out in the plurality of columns, the noises derived from the transistor which are superimposed on the reference signal Vref can be averaged. As a result, the image quality can be improved.

Fifth Exemplary Embodiment

Figure 18:
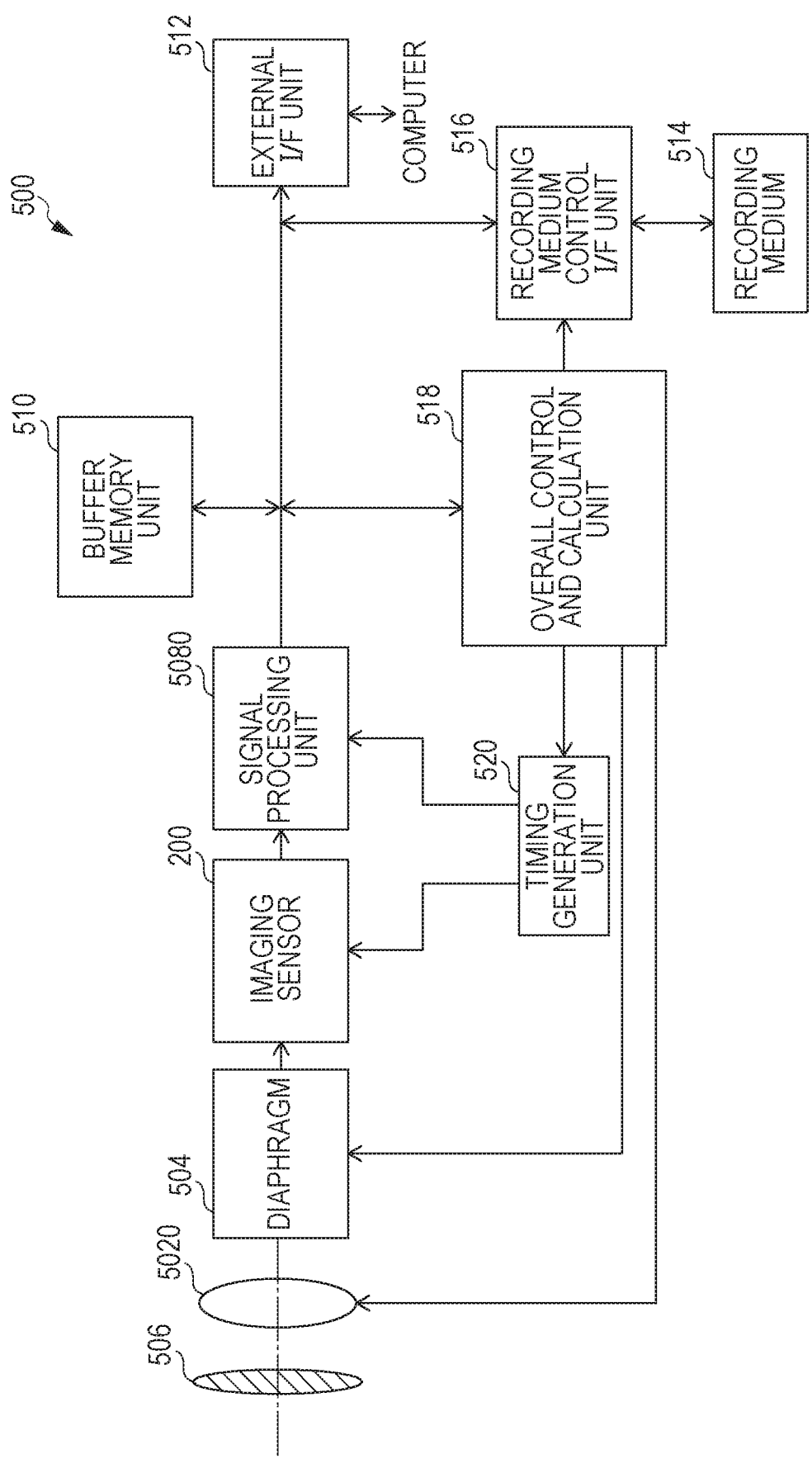
FIG. 18 illustrates a configuration of an imaging system.

FIG. 18 is a block diagram illustrating a configuration of an imaging system 500 according to the present exemplary embodiment. The imaging system 500 according to the present exemplary embodiment includes an imaging sensor 200 to which any one of the configurations of the imaging sensors described according to the above-described respective exemplary embodiments. Specific examples of the imaging system 500 include a digital still camera, a digital camcorder, a monitoring camera, and the like. FIG. 18 illustrates a configuration example of the digital still camera in which the imaging sensor according to any one of the above-described respective exemplary embodiments is applied as the imaging sensor 200.

The imaging system 500 exemplified in FIG. 18 includes the imaging sensor 200, a lens 5020 that forms an optical image of a subject on the imaging sensor 200, a diaphragm 504 for setting an amount of light that passes through the lens 5020 to be variable, and a barrier 506 for protecting the lens 5020. The lens 5020 and the diaphragm 504 correspond to an optical system that focuses the light to the imaging sensor 200.

The imaging system 500 also includes a signal processing unit 5080 that performs processing for the output signal output from the imaging sensor 200. The signal processing unit 5080 performs an operation of signal processing for appropriately performing various corrections and compressions with respect to the input signals and outputting the signals. The signal processing unit 5080 may also be provided with a function for executing AD conversion processing with respect to the output signal output from the imaging sensor 200. In this case, the AD converter may be provided inside the imaging sensor 200, but it is also sufficient when the AD converter is not provided.

The imaging system 500 further includes a buffer memory unit 510 that temporarily stores image data and an external interface unit (external I/F unit) 512 configured to establish an communication with an external computer or the like. The imaging system 500 further includes a recording medium 514 such as a semiconductor memory configured to perform recording or readout of imaging data and a recording medium control interface unit (recording medium control I/F unit) 516 configured to perform recording or readout with respect to the recording medium 514. It should be noted that the recording medium 514 may be built in the imaging system 500 or may also be detachable.

The imaging system 500 further includes an overall control and calculation unit 518 configured to perform various calculations and also control an entirety of the digital still camera, the imaging sensor 200 and a timing generation unit 520 configured to output various timing signals to the signal processing unit 5080. Herein, the timing signals or the like may also be input from the outside. It is sufficient when the imaging system 500 includes at least the imaging sensor 200 and the signal processing unit 5080 that processes the output signals output from the imaging sensor 200. The overall control and calculation unit 518 and the timing generation unit 520 may be configured so as to execute part or all of the control functions of the imaging sensor 200.

The imaging sensor 200 outputs an image signal to the signal processing unit 5080. The signal processing unit 5080 executes predetermined signal processing with respect to the image signal output from the imaging sensor 200 and outputs image data. The signal processing unit 5080 also generates an image by using the image signal.

When the imaging system is constituted by using the imaging sensor based on the imaging sensor according to the above-described respective exemplary embodiments, it is possible to realize the imaging system that can obtain an image having a still better image quality.

Sixth Exemplary Embodiment

The imaging system and a moving body according to the present exemplary embodiment will be described with reference to FIGS. 19A and 19B and FIG. 20.

Figure 19A:
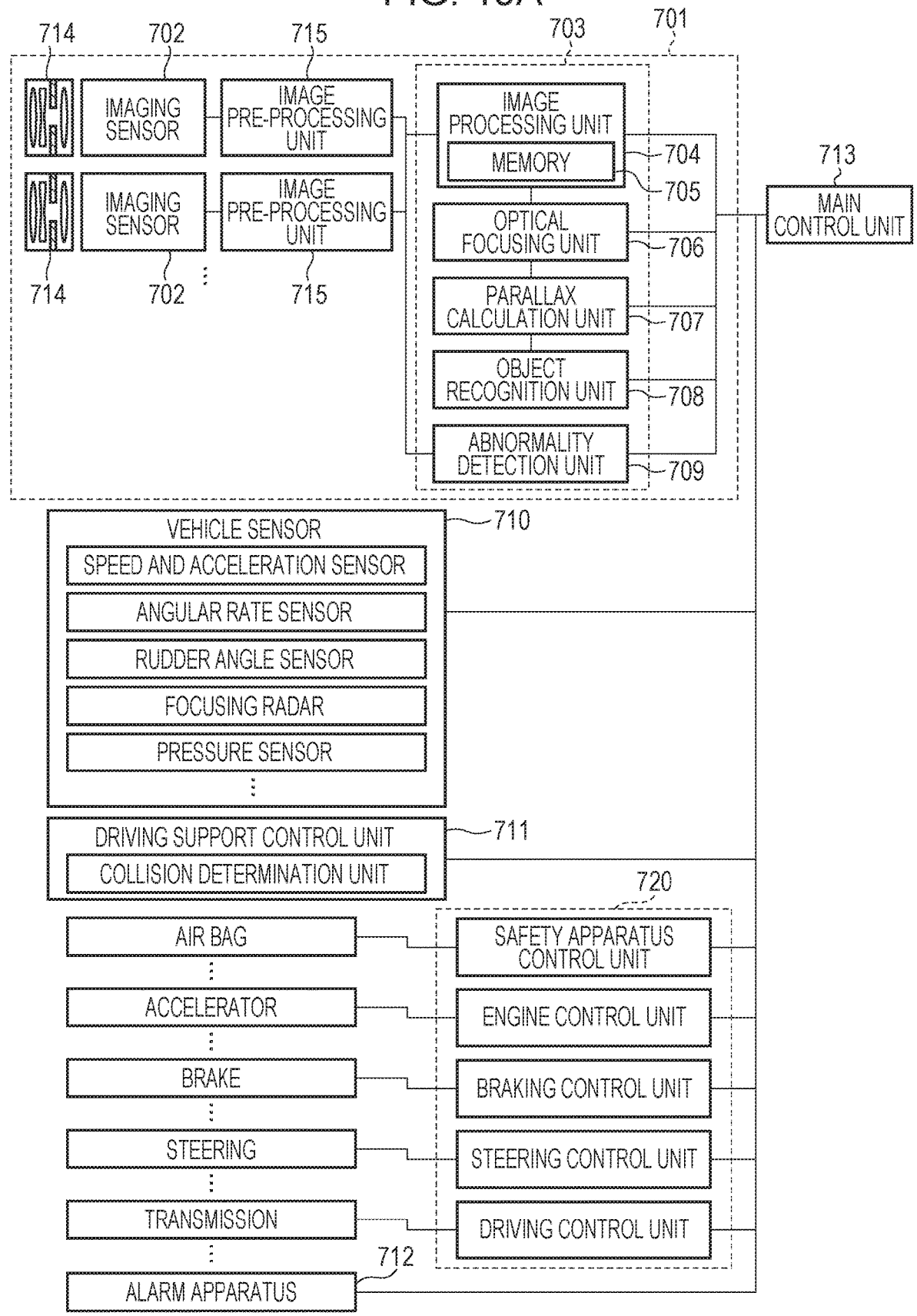
Figure 20:
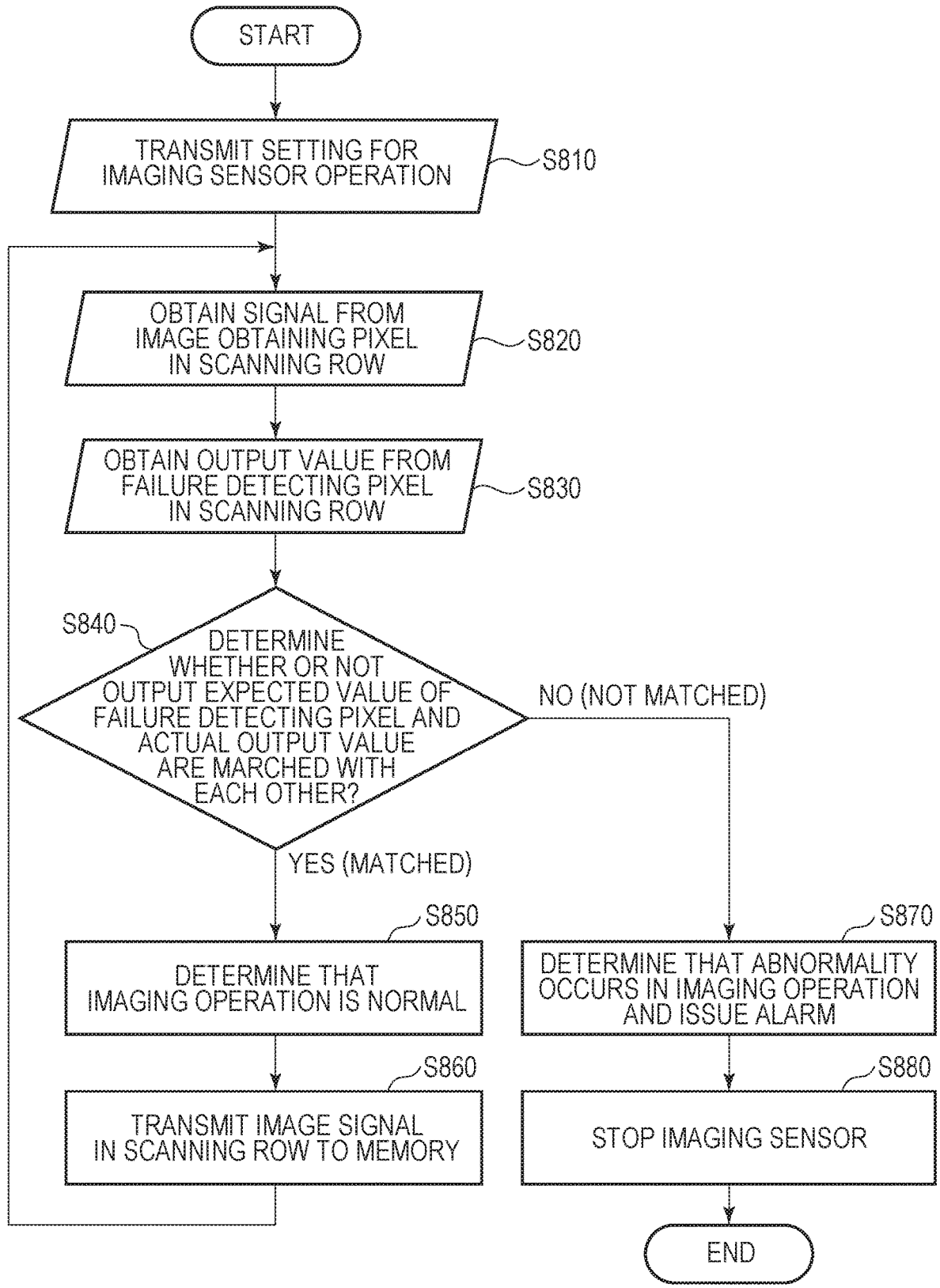
FIG. 20 illustrates processing of the imaging system.

FIGS. 19A and 19B are schematic diagrams illustrating configuration examples of the imaging system and the moving body according to the present exemplary embodiment. FIG. 20 is a flow chart illustrating the operation of the imaging system according to the present exemplary embodiment.

According to the present exemplary embodiment, an example of the imaging system related to an on-vehicle camera is illustrated. FIGS. 19A and 19B illustrate examples of a vehicle system and an imaging system mounted to this vehicle system. An imaging system 701 includes an imaging sensor 702, an image pre-processing unit 715, an integrated circuit 703, and an optical system 714. The optical system 714 focuses an optical image of an object on the imaging sensor 702. The imaging sensor 702 converts the optical image of the object focused by the optical system 714 into an electric signal. The imaging sensor 702 is the imaging sensor according to any one of the above-described respective exemplary embodiments. The image pre-processing unit 715 performs predetermined signal processing on the signal output from the imaging sensor 702. A function of the image pre-processing unit 715 may be incorporated in the imaging sensor 702. At least two sets of the optical systems 714, the imaging sensors 702, and the image pre-processing units 715 are provided in the imaging system 701, and the output from the image pre-processing unit 715 of each of the sets is input to the integrated circuit 703.

The integrated circuit 703 is an integrated circuit for an imaging system use and includes an image processing unit 704 including a memory 705, an optical focusing unit 706, a parallax calculation unit 707, an object recognition unit 708, and an abnormality detection unit 709. The image processing unit 704 performs image processing such as development processing or defect correction on the output signal of the image pre-processing unit 715. The memory 705 stores a primary memory of the captured image and a defect position of the imaging pixel. The optical focusing unit 706 performs focusing of the object and ranging. The parallax calculation unit 707 calculates parallax (phase difference of parallax images) from plural pieces of image data obtained by the plurality of imaging sensors 702. The object recognition unit 708 recognizes an object such as a car, a road, a road sign, or a person. When an abnormality of the imaging sensor 702 is detected, the abnormality detection unit 709 notifies a main control unit 713 of the abnormality.

The integrated circuit 703 may be realized by dedicatedly designed hardware or a software module or may also be realized by a combination of these. In addition, the integrated circuit 703 may be realized by a field programmable gate array (FPGA), an application specific integrated circuit (ASIC), or the like or may also be realized by a combination of these.

The main control unit 713 governs and controls operations of the imaging system 701, a vehicle sensor 710, a control unit 720, and the like. It should be noted that a method (for example, CAN standards) may also be adopted with which the main control unit 713 is not provided, and the imaging system 701, the vehicle sensor 710, and the control unit 720 individually include communication interfaces and respectively transmit and receive control signals via communication networks (for example, Controller Area Network (CAN) standards).

The integrated circuit 703 includes a function of receiving the control signal from the main control unit 713 or transmitting the control signal or a setting value to the imaging sensor 702 by its own control unit. For example, the integrated circuit 703 transmits a setting for the voltage switch 13 in the imaging sensor 702 to perform pulse driving, a setting for switching the voltage switch 13 for every frame, and the like.

The imaging system 701 is connected to the vehicle sensor 710 and can detect its own vehicle travelling states such as a vehicle speed, a yaw rate, and a rudder angle, an environment outside its own vehicle, and states of other vehicles and obstacles. The vehicle sensor 710 is also a distance information obtaining unit configured to obtain distance information from a parallax image to an object. The imaging system 701 is connected to a driving support control unit 711 that performs various driving supports such as automated steering, automated cruising, and a collision prevention function. In particular, with regard to the collision prevention function, a collision with the other vehicles and the obstacles is estimated and the presence or absence of collision is determined on the basis of detection results of the imaging system 701 and the vehicle sensor 710. With this configuration, collision avoidance control and safety apparatus activation at the time of the collision are performed in a case where the collision is estimated.

The imaging system 701 is also connected to an alarm apparatus 712 that issues an alarm to a driver on the basis of the determination result of the collision determination unit. For example, in a case where a collision probability is high as the determination result of the collision determination unit, the main control unit 713 performs vehicle control for avoiding the collision or alleviating damages by applying brake, returning an accelerator, and suppressing an engine output, for example. The alarm apparatus 712 issues an alarm to a user by emitting an alarm such as sound, displaying alarm information on a screen of a display unit such as a car navigation system or a gauge panel, and supplying vibration to a seat belt or steering, for example.

According to the present exemplary embodiment, a surrounding of the vehicle such as, for example, a forward area or a backward area is imaged by the imaging system 701. FIG. 19B illustrates an arrangement example of the imaging system 701 in a case where the forward area of the vehicle is imaged by the imaging system 701.

The two imaging sensors 702 are arranged in a front part of a vehicle 700. Specifically, a center line with respect to forward and backward directions of the vehicle 700 or an external shape (for example, a vehicle width) is regarded as a symmetric axis, and the two imaging sensors 702 are arranged so as to have line symmetry with respect to the symmetric axis. The above-described configuration is preferably adopted when the distance information between the vehicle 700 and the object to be imaged is obtained and the collision probability is determined. In addition, the imaging sensors 702 are preferably arranged at positions that do not disturb a sight of a driver when the driver visually checks a situation outside the vehicle 700 from a driver's seat. The alarm apparatus 712 is preferably arranged at a position where the alarm apparatus easily comes into the sight of the driver.

Next, the failure detection operation of the imaging sensor 702 in the imaging system 701 will be described with reference to FIG. 20. The failure detection operation of the imaging sensor 702 is executed while following steps S810 to S880 illustrated in FIG. 20.

Step S810 is a step for performing a setting at the time of start-up of the imaging sensor 702. That is, the setting for the operation of the imaging sensor 702 is transmitted from the outside of the imaging system 701 (for example, the main control unit 713) or the inside of the imaging system 701, and the imaging operation of the imaging sensor 702 and the failure detection operation are started.

Thereafter, in step S820, the pixel signal is obtained from the effective pixel. In step S830, an output value from a failure detecting pixel arranged to detect a failure is obtained. The failure detecting pixel is also provided with a photoelectric conversion unit similarly as in the effective pixel. A predetermined voltage is written into the photoelectric conversion unit. The failure detecting pixel outputs a signal corresponding to the voltage written into the photoelectric conversion unit. It should be noted that step S820 and step S830 may also be reversed.

Thereafter, in step S840, determination on whether or not the output expected value from the failure detecting pixel is matched with the actual output value from the failure detecting pixel is performed.

As a result of the matching determination in step S840, in a case where the output expected values are matched with the actual output values, the processing step shifts to step S850, and it is determined that the imaging operation is normally performed. Then the processing step shifts to step S860. In step S860, the pixel signal in the scanning row is transmitted to the memory 705 and primarily saved. Thereafter, the processing step returns to step S820, and the failure detection operation continues.

On the other hand, as a result of the matching determination in step S840, in a case where the output expected value is not matched with the actual output value, the processing step shifts to step S870. In step S870, it is determined that an abnormality occurs in the imaging operation, and an alarm is issued to the main control unit 713 or the alarm apparatus 712. The alarm apparatus 712 causes the display unit to display an effect that the abnormality has been detected. Thereafter, in step S880, the imaging sensor 702 stops, and the operation of the imaging system 701 ends.

It should be noted that the example in which the flow chart loops every row has been described according to the present exemplary embodiment, but the flow chart may loop every plural rows, or the failure detection operation may be performed every frame.

It should be noted that a section outside the vehicle may be notified of the issuance of the warning in step S870 via a wireless network.

In addition, the control for avoiding the collision with the other vehicle has been described according to the present exemplary embodiment, but the technology can be applied to control for following the other vehicle to perform automated driving, control for the automated driving without drifting from a lane, or the like. Furthermore, the imaging system 701 can be applied to not only the vehicle such as an automobile but also a moving body (moving apparatus) such as, for example, a vessel, aircraft, or industrial robot. In addition, the imaging system can be widely applied to not only the moving body but also a device using object recognition such as an intelligent transport system (ITS).

MODIFIED EXAMPLES

Not only the above-described exemplary embodiments but also various modifications can be made with regard to the disclosure.

For example, exemplary embodiments of the disclosure also include an example in which part of the configurations according to any one of the exemplary embodiments is added to the other exemplary embodiment and an example in which the configuration is replaced with part of the configuration according to the other exemplary embodiment.

The above-described exemplary embodiments are all merely examples of the specified configurations for carrying out the disclosure, and the technical scope of the disclosure is not be restrictively interpreted by these exemplifications. That is, the exemplary embodiments of the disclosure can be carried out in various modes without departing from its technical concept or its main features.

Advantages

According to the exemplary embodiments of the disclosure, it is possible to provide the appropriate circuit configuration in which the circuit area in the combination of the successive approximation AD converter and the amplifier is reduced.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-192053 filed Sep. 29, 2017, which is hereby incorporated by reference herein in its entirety.

What is claimed is:

1. An imaging sensor comprising:
   a pixel configured to output a pixel signal;
   an amplifier configured to output an amplification signal obtained by amplifying the pixel signal; and
   a successive approximation analog-to-digital (AD) converter configured to generate a digital signal having a plurality of bits by performing AD conversion of the amplification signal,
   wherein the AD converter performs a comparison of the digital signal and a predetermined digital signal value,
   wherein, in a case where a result of the comparison indicates that an amplitude of the digital signal is smaller than the predetermined digital signal value, the amplifier sets a gain to be applied to the pixel signal as a first gain and outputs the amplification signal, and the AD converter performs the AD conversion of the amplification signal amplified at the first gain,
   wherein, in a case where the result of the comparison indicates that the amplitude of the digital signal is larger than the predetermined digital signal value, the amplifier sets the gain to be applied to the pixel signal as a second gain that is lower than the first gain and outputs the amplification signal, and the AD converter performs the AD conversion of the amplification signal amplified at the second gain, and
   wherein the pixel is arranged in a first chip, the amplifier and the AD converter are arranged in a second chip, and the first chip and the second chip are stacked on each other.

2. The imaging sensor according to claim 1, wherein the detection corresponds to a comparison between a threshold having a predetermined value and the amplification signal.

3. An imaging sensor comprising:
   a pixel configured to output a pixel signal;
   an amplifier configured to output an amplification signal obtained by amplifying the pixel signal; and
   a successive approximation analog-to-digital (AD) converter configured to perform AD conversion of the amplification signal,
   wherein the AD converter detects whether or not the amplification signal is within a predetermined signal range,
   wherein, in a case where a result of the detection indicates that an amplitude of the amplification signal is smaller than a predetermined value, the amplifier sets a gain to be applied to the pixel signal as a first gain and outputs the amplification signal, and the AD converter performs the AD conversion of the amplification signal amplified at the first gain,
   wherein, in a case where the result of the detection indicates that the amplitude of the amplification signal is larger than the predetermined value, the amplifier sets the gain to be applied to the pixel signal as a second gain that is lower than the first gain and outputs the amplification signal, and the AD converter performs the AD conversion of the amplification signal amplified at the second gain,
   wherein the pixel is arranged in a first chip, the amplifier and the AD converter are arranged in a second chip, and the first chip and the second chip are stacked on each other,
   wherein the detection corresponds to a comparison between a threshold having a predetermined value and the amplification signal,
   wherein the AD converter includes a digital-to-analog converter configured to output a comparison signal and a comparator configured to compare the comparison signal with the amplification signal, and
   wherein the threshold is generated by the digital-to-analog converter.

4. An imaging sensor further comprising:
a pixel configured to output a pixel signal;
an amplifier configured to output an amplification signal obtained by amplifying the pixel signal; and
a successive approximation analog-to-digital (AD) converter configured to perform AD conversion of the amplification signal,
wherein the AD converter detects whether or not the amplification signal is within a predetermined signal range,
wherein, in a case where a result of the detection indicates that an amplitude of the amplification signal is smaller than a predetermined value, the amplifier sets a gain to be applied to the pixel signal as a first gain and outputs the amplification signal, and the AD converter performs the AD conversion of the amplification signal amplified at the first gain,
wherein, in a case where the result of the detection indicates that the amplitude of the amplification signal is larger than the predetermined value, the amplifier sets the gain to be applied to the pixel signal as a second gain that is lower than the first gain and outputs the amplification signal, and the AD converter performs the AD conversion of the amplification signal amplified at the second gain,
wherein the pixel is arranged in a first chip, the amplifier and the AD converter are arranged in a second chip, and the first chip and the second chip are stacked on each other, the imaging sensor further comprising:
a multiplex circuit; and
a plurality of amplifiers,
wherein the plurality of amplifiers are connected to an input node of the multiplex circuit, and the AD converter is connected to an output node of the multiplex circuit.

5. The imaging sensor according to claim 1, further comprising:
a multiplex circuit; and
a plurality of amplifiers,
wherein the plurality of amplifiers are connected to an input node of the multiplex circuit, and the AD converter is connected to an output node of the multiplex circuit.

6. The imaging sensor according to claim 3, further comprising:
a multiplex circuit; and
a plurality of amplifiers,
wherein the plurality of amplifiers are connected to an input node of the multiplex circuit, and the AD converter is connected to an output node of the multiplex circuit.

7. The imaging sensor according to claim 4,
wherein the plurality of amplifiers respectively amplify the pixel signals output by mutually different pixels,
wherein periods for amplifying the respective pixel signals of the plurality of amplifiers are at least partially overlapped with each other, and
wherein, after the multiplex circuit outputs the signals output by one part of the amplifiers among the plurality of amplifiers to the AD converter, the multiplex circuit outputs the signals output by another part of the amplifiers among the plurality of amplifiers to the AD converter.

8. The imaging sensor according to claim 5,
wherein the plurality of amplifiers respectively amplify the pixel signals output by mutually different pixels,
wherein periods for amplifying the respective pixel signals of the plurality of amplifiers are at least partially overlapped with each other, and
wherein, after the multiplex circuit outputs the signals output by one part of the amplifiers among the plurality of amplifiers to the AD converter, the multiplex circuit outputs the signals output by another part of the amplifiers among the plurality of amplifiers to the AD converter.

9. The imaging sensor according to claim 1, further comprising:
a reference pixel configured to output a reference signal,
wherein the reference pixel is connected to a plurality of amplifiers.

10. The imaging sensor according to claim 9,
wherein the amplifier includes a first input node and a second input node to which the pixel signal is input, and
wherein the reference signal is commonly input to the first input node of each of the plurality of amplifiers.

11. The imaging sensor according to claim 1,
wherein the first chip includes a pixel array in which a plurality of the pixels are arranged in a plurality of rows and a plurality of columns, and
wherein at least one of the amplifier and the AD converter in the second chip is overlapped with one pixel among the plurality of pixels in a plan view.

12. The imaging sensor according to claim 4,
wherein the first chip includes a pixel array in which a plurality of the pixels are arranged in a plurality of rows and a plurality of columns, and
wherein at least one of the multiplex circuit, the amplifier, and the AD converter in the second chip is overlapped with one pixel among the plurality of pixels in a plan view.

13. The imaging sensor according to claim 4,
wherein the first chip includes a pixel array in which a plurality of the pixels are arranged in a plurality of rows and a plurality of columns and a signal line to which the pixels in one column among the plurality of pixels are connected, and
wherein a connection part where the signal line and the multiplex circuit are connected to each other is arranged at a position overlapped with the pixel array in a plan view.

14. The imaging sensor according to claim 7,
wherein the first chip includes a pixel array in which a plurality of the pixels are arranged in a plurality of rows and a plurality of columns,
wherein the first chip includes a signal line to which the pixels in one column among the plurality of pixels are connected, and
wherein a connection part where the signal line and the multiplex circuit are connected to each other is arranged at a position overlapped with the pixel array in a plan view.

15. A chip stacked on a pixel chip, where a pixel is arranged, and configured to perform analog-to-digital (AD) conversion of a pixel signal output by the pixel chip, the chip comprising:
an amplifier configured to output an amplification signal obtained by amplifying the pixel signal; and
a successive approximation AD converter configured to generate a digital signal having a plurality of bits by performing AD conversion of the amplification signal,
wherein the AD converter performs a comparison of the digital signal and a predetermined digital signal value, wherein, in a case where a result of the comparison indicates that an amplitude of the digital signal is smaller than the predetermined digital signal value, the amplifier sets a gain to be applied to the pixel signal as a first gain and outputs the amplification signal, and the AD converter performs the AD conversion of the amplification signal amplified at the first gain, and wherein, in a case where the result of the comparison indicates that the amplitude of the digital signal is larger than the predetermined digital signal value, the amplifier sets the gain to be applied to the pixel signal as a second gain that is lower than the first gain and outputs the amplification signal, and the AD converter performs the AD conversion of the amplification signal amplified at the second gain.

16. An imaging system comprising:
the imaging sensor according to claim 1; and
a signal processing unit configured to generate an image by processing a signal output by the imaging sensor.

17. A moving body comprising:
the imaging sensor according to claim 1;
a distance information obtaining unit configured to obtain distance information to an object on a basis of a parallax image based on a signal from the imaging sensor; and
a control unit configured to control the moving body on a basis of the distance information.

18. A chip stacked on a pixel chip, where a pixel is arranged, and configured to perform analog-to-digital (AD) conversion of a pixel signal output by the pixel chip, the chip comprising:
an amplifier configured to output an amplification signal obtained by amplifying the pixel signal; and
a successive approximation analog-to-digital (AD) converter configured to perform AD conversion of the amplification signal,
wherein the AD converter detects whether or not the amplification signal is within a predetermined signal range,
wherein, in a case where a result of the detection indicates that an amplitude of the amplification signal is smaller than a predetermined value, the amplifier sets a gain to be applied to the pixel signal as a first gain and outputs the amplification signal, and the AD converter performs the AD conversion of the amplification signal amplified at the first gain,
wherein, in a case where the result of the detection indicates that the amplitude of the amplification signal is larger than the predetermined value, the amplifier sets the gain to be applied to the pixel signal as a second gain that is lower than the first gain and outputs the amplification signal, and the AD converter performs the AD conversion of the amplification signal amplified at the second gain,
wherein the pixel is arranged in a first chip, the amplifier and the AD converter are arranged in a second chip, and the first chip and the second chip are stacked on each other,
wherein the detection corresponds to a comparison between a threshold having a predetermined value and the amplification signal,
wherein the AD converter includes a digital-to-analog converter configured to output a comparison signal and a comparator configured to compare the comparison signal with the amplification signal, and wherein the threshold is generated by the digital-to-analog converter.

19. A chip stacked on a pixel chip, where a pixel is arranged, and configured to perform analog-to-digital (AD) conversion of a pixel signal output by the pixel chip, the chip comprising:
an amplifier configured to output an amplification signal obtained by amplifying the pixel signal; and
a successive approximation analog-to-digital (AD) converter configured to perform AD conversion of the amplification signal,
wherein the AD converter detects whether or not the amplification signal is within a predetermined signal range,
wherein, in a case where a result of the detection indicates that an amplitude of the amplification signal is smaller than a predetermined value, the amplifier sets a gain to be applied to the pixel signal as a first gain and outputs the amplification signal, and the AD converter performs the AD conversion of the amplification signal amplified at the first gain,
wherein, in a case where the result of the detection indicates that the amplitude of the amplification signal is larger than the predetermined value, the amplifier sets the gain to be applied to the pixel signal as a second gain that is lower than the first gain and outputs the amplification signal, and the AD converter performs the AD conversion of the amplification signal amplified at the second gain,
wherein the pixel is arranged in a first chip, the amplifier and the AD converter are arranged in a second chip, and the first chip and the second chip are stacked on each other,
the imaging sensor further comprising:
a multiplex circuit; and
a plurality of amplifiers,
wherein the plurality of amplifiers are connected to an input node of the multiplex circuit, and the AD converter is connected to an output node of the multiplex circuit.

20. An imaging system comprising:
the imagging sensor according to claim 3; and
a signal processing unit configured to generate an image by processing a signal output by the imaging sensor.

21. A moving body comprising:
the imaging sensor according to claim 3;
a distance information obtaining unit configured to obtain distance information to an object on a basis of a parallax image based on a signal from the imaging sensor; and
a control unit configured to control the moving body on a basis of the distance information.

22. An imaging system comprising:
the imaging sensor according to claim 4; and
a signal processing unit configured to generate an image by processing a signal output by the imaging sensor.

23. A moving body comprising:
the imaging sensor according to claim 4;
a distance information obtaining unit configured to obtain distance information to an object on a basis of a parallax image based on a signal from the imaging sensor; and
a control unit configured to control the moving body on a basis of the distance information.

* * * * *